US010511409B2

(12) United States Patent
Hosokawa et al.

(10) Patent No.: US 10,511,409 B2
(45) Date of Patent: Dec. 17, 2019

(54) RECEIVED SIGNAL PROCESSOR AND METHOD FOR PROCESSING RECEIVED SIGNAL

(71) Applicant: NEC CORPORATION, Tokyo (JP)

(72) Inventors: Kohei Hosokawa, Tokyo (JP); Toshiharu Ito, Tokyo (JP); Manabu Arikawa, Tokyo (JP); Seigo Takahashi, Tokyo (JP); Takashi Ishikawa, Tokyo (JP); Yoshimasa Ono, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/773,035

(22) PCT Filed: Nov. 1, 2016

(86) PCT No.: PCT/JP2016/004779
§ 371 (c)(1),
(2) Date: May 2, 2018

(87) PCT Pub. No.: WO2017/077703
PCT Pub. Date: May 11, 2017

(65) Prior Publication Data
US 2018/0323904 A1 Nov. 8, 2018

(30) Foreign Application Priority Data

Nov. 4, 2015 (JP) ................................ 2015-216736

(51) Int. Cl.
*H04L 1/00* (2006.01)
*H04L 27/22* (2006.01)
(Continued)

(52) U.S. Cl.
CPC .......... *H04L 1/0057* (2013.01); *H04B 10/118* (2013.01); *H04B 10/61* (2013.01);
(Continued)

(58) Field of Classification Search
CPC ... H04L 1/0057; H04L 27/0014; H04L 27/22; H04L 2027/0057; H04B 17/336; H04B 10/118; H04B 10/61
See application file for complete search history.

(56) References Cited

U.S. PATENT DOCUMENTS

| 2004/0005017 A1* | 1/2004 | Borowski | ........... H04L 27/0014 |
| | | | 375/329 |
| 2006/0245766 A1* | 11/2006 | Taylor | ................... H04B 10/60 |
| | | | 398/208 |

(Continued)

FOREIGN PATENT DOCUMENTS

| JP | 2009-198364 A | 9/2009 |
| JP | 2015-005805 A1 | 1/2015 |

(Continued)

OTHER PUBLICATIONS

Written Opinion for PCT/JP2016/004779, dated Dec. 27, 2016.
International Search Report for PCT/JP2016/004779, dated Dec. 27, 2016.

*Primary Examiner* — Curtis A Alia
(74) *Attorney, Agent, or Firm* — Sughrue Mion, PLLC

(57) ABSTRACT

An appropriate synthesized signal cannot be obtained by only correcting relative phase errors of a plurality of received signals; therefore, a received signal processor according to an exemplary aspect of the present invention includes a plurality of signal-to-noise ratio estimation means for estimating respective signal-to-noise ratios of a plurality of digital signal sequences in which relative phase errors of a plurality of received signal sequences having been corrected; a plurality of temporary decision means for performing symbol decisions of the plurality of digital signal sequences and outputting symbol signal sequences; symbol-map-rotation determination means for determining respective phase rotation amounts of the plurality of digital signal sequences from the plurality of symbol signal sequences and the respective signal-to-noise ratios of the plurality of digital signal sequences; and a plurality of phase rotation means for rotating phases of the plurality of digital signal sequences respectively based on the phase rotation amounts.

19 Claims, 15 Drawing Sheets

(51) Int. Cl.
*H04B 10/118* (2013.01)
*H04B 10/61* (2013.01)
*H04L 27/00* (2006.01)

(52) U.S. Cl.
CPC .......... *H04L 27/0014* (2013.01); *H04L 27/22* (2013.01); *H04L 2027/0057* (2013.01)

(56) References Cited

U.S. PATENT DOCUMENTS

2008/0273585 A1\* 11/2008 Kim .................... H04L 27/0014
  375/226
2014/0126902 A1   5/2014 Swanson et al.

FOREIGN PATENT DOCUMENTS

WO    2014/119270 A1   8/2014
WO    2015/136572 A1   9/2015

\* cited by examiner

FIG. 6

| | | | | t → |
|---|---|---|---|---|
| PHASE (A) OF MODE WITH HIGHEST SIGNAL-TO-NOISE RATIO | π/4 | 3π/4 | π/4 | 5π/4 |
| PHASE (B) IN MODE X AFTER TEMPORARY DECISION | 3π/4 | 5π/4 | 3π/4 | 7π/4 |
| OPERATION OF PHASE ROTATION MEANS 240 | PHASE ROTATION BY −π/2 | | | |
| PHASE (C) AFTER PHASE ROTATION IN MODE X | π/4 | 3π/4 | π/4 | 5π/4 |

FIG. 10

| | SYMBOL PATTERN |
|---|---|
| HIGHEST SIGNAL-TO-NOISE RATIO | (1, 1)→(0, 1)→(0, 0)→(1, 0) |
| NO CYCLE SLIP | (1, 1)→(1, 1)→(0, 1)→(0, 0) |
| FOURTH SYMBOL ON POSITIVE SIDE | (1, 0)→(1, 0)→(1, 1)→(0, 1) |
| THIRD SYMBOL ON POSITIVE SIDE | (1, 1)→(1, 0)→(1, 1)→(0, 1) |
| SECOND SYMBOL ON POSITIVE SIDE | (1, 1)→(1, 1)→(1, 1)→(0, 1) |
| FIRST SYMBOL ON POSITIVE SIDE | (1, 1)→(1, 1)→(0, 1)→(0, 1) |
| FOURTH SYMBOL ON NEGATIVE SIDE | (0, 1)→(0, 1)→(0, 0)→(1, 0) |
| THIRD SYMBOL ON NEGATIVE SIDE | (1, 1)→(0, 1)→(0, 0)→(1, 0) |
| SECOND SYMBOL ON NEGATIVE SIDE | (1, 1)→(1, 1)→(0, 0)→(1, 0) |
| FIRST SYMBOL ON NEGATIVE SIDE | (1, 1)→(1, 1)→(0, 1)→(1, 0) |

RECEIVED SIGNAL PROCESSOR AND METHOD FOR PROCESSING RECEIVED SIGNAL

This application is a National Stage of International Application No. PCT/JP2016/004779 filed Nov. 1, 2016, claiming priority based on Japanese Patent Application No. 2015-216736 filed Nov. 4, 2015, the disclosure of which is incorporated herein in its entirety by reference.

TECHNICAL FIELD

The present invention relates to received signal processors and methods for processing received signals and, in particular, to a received signal processor and a method for processing a received signal that are used in a free space optical communication system to perform optical communication using a laser light beam propagating through free space.

BACKGROUND ART

With the recent improvement in performance of observation devices installed in an aircraft and an artificial satellite, it is required to increase the transmission capacity in transmitting data from an aircraft or an artificial satellite to the earth. In order to respond to an anticipated request to further increase the transmission capacity, research and development on a free space optical communication system have been carried out by which the transmission capacity can be increased dramatically compared to the conventionally used microwave wireless communication system.

The current free space optical communication system uses the intensity modulation and direct detection scheme in which communication is performed using light intensity making "1" and "0" of digital signals to be transmitted correspond to "ON" and "OFF" of optical signals, or the pulse position modulation scheme. This makes it difficult to increase the transmission capacity further. A further increase in transmission capacity requires applying digital coherent technologies used in the optical fiber communication system to the free space optical communication system.

In the free space optical communication system, a laser beam with a wavelength (1.55 micrometers (μm)) employed in the optical fiber communication system is mainly used, and it enables communication to propagate the laser beam through the atmosphere. As a result, the free space optical communication is easily influenced by the state of the atmosphere, and it becomes unstable easily compared to the microwave communication. A fluctuation of the laser beam due to the state of the atmosphere is generally called an atmospheric fluctuation. The atmospheric fluctuation becomes a major problem especially when the received laser beam is coupled to a single-mode fiber with a small core diameter that is used in digital coherent technologies.

Patent Literature 1 discloses technologies to solve such a problem. A free space optical receiver disclosed in Patent Literature 1 includes light collecting means for collecting laser light having propagated through a free space transmission path, a multimode transmission medium, mode converting means, mode separating means, a plurality of single mode transmission media, a plurality of light receiving means, and signal processing means.

Signal light subjected to a wave-front fluctuation after having propagated through a free space transmission path is subjected to a mode conversion in the mode conversion means, and then separated into a plurality of orthogonal modes by the mode separating means. In this case, the mode converting means makes it possible to receive selectively only single mode signal light that can be coupled to the single mode fiber and can be separated in the mode separating means from among many propagation modes of the multimode transmission medium. As a result, according to the free space optical receiver described in Patent Literature 1, it is possible to satisfy both of a higher bit rate of the transmission signal and highly efficient fiber coupling, and it becomes possible to achieve the high-capacity free space optical communication.

Patent Literature 2 discloses an optical transmission system in which identical optical signals are transmitted in parallel using optical transmission lines such as multicore fibers. A redundant optical signal receiver included in the optical transmission system is composed of an optical signal receiver and a digital signal processor. The optical signal receiver performs a coherent detection on optical signals transmitted through the optical transmission lines, performs an analog-to-digital conversion on the resultant signals, and then outputs digital signals. The digital signal processor receives the input of the digital signals output from the optical signal receiver, performs phase synchronization and waveform equalization, and synthesizes signals. The digital signal processor is composed of an adaptive equalizer, a phase synchronizer, and a signal synthesizer; and a phase difference and a phase synchronization signal outputted from the phase synchronizer, and a phase synchronization signal outputted from a phase synchronizer used as a reference are fed back to the adaptive equalizer, respectively. The signal synthesizer receives input of the phase synchronization signal outputted from the phase synchronizer, performs equal gain combining or maximal ratio combining, and outputs a synthesized signal.

With such a configuration, the optical transmission system disclosed in Patent Literature 2 can facilitate high-capacity transmission with improved transmission quality.

CITATION LIST

Patent Literature

[PTL 1] WO 2015/136572
[PTL 2] JP 2015-005805 A

SUMMARY OF INVENTION

Technical Problem

In the above-mentioned system in which that the synthesis is performed on a plurality of signals, the maximal ratio combining method is known as one method to maximize the signal-to-noise ratio of the signal after the synthesis. A transmission system using the maximal ratio combining method will be described below with reference to FIG. 13.

FIG. 13 is a block diagram illustrating a related transmission system using the maximal ratio combining method. The transmission system is composed of a transmitting block including a transmitting antenna 10 to send data signals, and a receiving block including two receiving antennas, that is, a first receiving antenna 21 and a second receiving antenna 22 to receive the data signals. A first transfer function between the transmitting antenna 10 and the first receiving antenna 21 is defined as $h_1$, and a second transfer function between the transmitting antenna 10 and the second receiving antenna 22 is defined as $h_2$.

The receiving block includes a first multiplier 23 that multiplies the data signal received using the first receiving antenna 21 by the conjugate value $h_1^*$ of the first transfer function, and a second multiplier 24 that multiplies the data signal received using the second receiving antenna 22 by the conjugate value $h_2^*$ of the second transfer function. The receiving block further includes an adder 25 that sums the signals multiplied by the conjugate values of the respective transfer functions.

A transmission system to perform free space optical communication from an artificial satellite to the earth requires a transfer function of a transmission line from a transmitter included in the artificial satellite to a signal processor included in a receiver on the earth, for a signal with each mode. It is difficult, however, to calculate accurately the effect of the atmospheric fluctuation on the phase of an optical signal, and the effect of a Doppler shift due to the movement of the transmitter. If the receiver on the earth includes a coherent optical receiver, it is difficult to calculate accurately the absolute influence of frequency and phase noise of local light as well.

Consequently, in optical fiber communications, relative frequency and phase noise is eliminated using the Decision-Directed Phase Locked Loop (DD-PLL) method.

FIG. 14 illustrates the configuration of a related DD-PLL processing unit. The DD-PLL processing unit includes an error detection unit 31, a loop filter unit 32, and a digitally controlled oscillator (DCO) unit 33. The error detection unit 31 estimates the phase error of each symbol. The m-th power estimation method can be used as such an estimation method, for example. The loop filter unit 32 smooths the estimated phase error and outputs a phase ϕ to be compensated in the DCO unit 33. This enables the DD-PLL processing unit to compensate for the relative phase error.

The DD-PLL processing unit, however, can compensate for only a relative phase error. As a result, there is the problem that a position at which to be locked differs because a compensation value differs depending on the state of noise even when the same symbol is continuously received. This problem will be specifically described below with reference to a constellation diagram for QPSK (quadrature phase shift keying) signals illustrated in FIG. 15. The problem is that, even when the transmitter continuously transmits symbols allocated to bit sequence (1, 1), the symbols are locked at a symbol corresponding to any one of bit sequences (1, 1), (0, 1), (0, 0), and (1, 0) after the DD-PLL processing unit included in the receiver has compensated. In order to solve the problem, the optical fiber communication system uses differential encoding with respect to transmitting symbol sequences, for example.

In contrast, if the maximal ratio combining method is applied to the free space optical receiver as described in Patent Literature 1 that processes signals with a plurality of modes, it is necessary to keep constant not the relative phase error but the absolute phase error or the phase errors in all modes. This is because, if only the relative phase error is compensated for, one mode signal (LP01, for example) can be locked at (1, 1), and the other mode signal (LP11a, for example) can be locked at (0, 0), for example, this makes it impossible to demodulate the signals correctly because of weakening each other.

In the DD-PLL method, if the input signal has a large amount of phase noise, a lock temporarily comes off, resulting in being locked at an adjacent symbol. This phenomenon is called a cycle slip. The occurrence of the cycle slip leads to the problem that the synthesis of a plurality of signals cannot be performed correctly because the signals are out of phase with each other after the DD-PLL processing.

As described above, there has been the problem that an appropriate synthesized signal cannot be obtained by only correcting relative phase errors of a plurality of received signals.

The object of the present invention is to provide a received signal processor and a method for processing a received signal that solve the above-mentioned problem that an appropriate synthesized signal cannot be obtained by only correcting the relative phase errors of a plurality of received signals.

Solution to Problem

A received signal processor according to an exemplary aspect of the present invention includes a plurality of signal-to-noise ratio estimation means for estimating respective signal-to-noise ratios of a plurality of digital signal sequences in which relative phase errors of a plurality of received signal sequences having been corrected; a plurality of temporary decision means for performing symbol decisions of the plurality of digital signal sequences and outputting symbol signal sequences; symbol-map-rotation determination means for determining respective phase rotation amounts of the plurality of digital signal sequences from the plurality of symbol signal sequences and the respective signal-to-noise ratios of the plurality of digital signal sequences; and a plurality of phase rotation means for rotating phases of the plurality of digital signal sequences respectively based on the phase rotation amounts.

A method for processing a received signal according to an exemplary aspect of the present invention includes estimating respective signal-to-noise ratios of a plurality of digital signal sequences in which relative phase errors of a plurality of received signal sequences having been corrected; generating a plurality of symbol signal sequences by performing symbol decisions of the plurality of digital signal sequences; determining respective phase rotation amounts of the plurality of digital signal sequences from the plurality of symbol signal sequences and the respective signal-to-noise ratios of the plurality of digital signal sequences; and rotating phases of the plurality of digital signal sequences respectively based on the phase rotation amounts.

Advantageous Effects of Invention

According to the received signal processor and the method for processing a received signal of the present invention, it is possible to obtain an appropriate synthesized signal from a plurality of digital signals in which only relative phase errors of a plurality of received signals have been corrected.

BRIEF DESCRIPTION OF DRAWINGS

FIG. 6 is another diagram to explain the operation of the signal-to-noise ratio estimation means included in the received signal processor according to the second example embodiment of the present invention.

FIG. 10 is another diagram to explain the operation of the cycle-slip detection means included in the received signal processor according to the third example embodiment of the present invention.

EXAMPLE EMBODIMENTS

Example embodiments of the present invention will be described below with reference to the drawings.

First Example Embodiment

Figure 1:
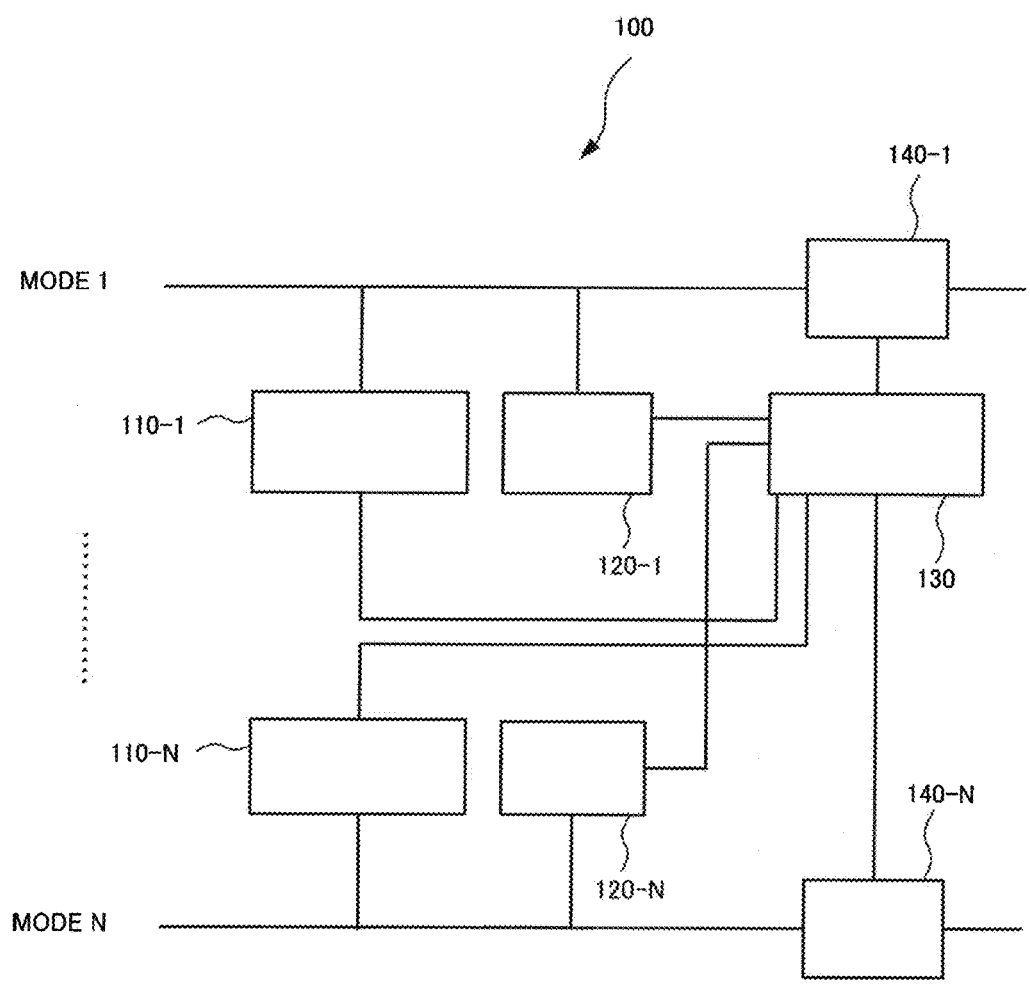
FIG. 1 is a block diagram illustrating the configuration of a received signal processor according to a first example embodiment of the present invention.

FIG. 1 is a block diagram illustrating the configuration of a received signal processor 100 according to a first example embodiment of the present invention. The received signal processor 100 includes a plurality of signal-to-noise ratio estimation means 110-1 to 110-N, a plurality of temporary decision means 120-1 to 120-N, a symbol-map-rotation determination means 130, and a plurality of phase rotation means 140-1 to 140-N. Here, N represents a natural number more than one.

The signal-to-noise ratio estimation means 110-1 to 110-N estimate respective signal-to-noise ratios of a plurality of digital signal sequences (mode 1 to mode N) in which the relative phase errors of a plurality of received signal sequences have been corrected. The temporary decision means 120-1 to 120-N perform symbol decisions of the plurality of digital signal sequences respectively and output symbol signal sequences. The symbol-map-rotation determination means 130 determines the respective phase rotation amounts of the plurality of digital signal sequences from the plurality of symbol signal sequences and the respective signal-to-noise ratios of the plurality of digital signal sequences. The phase rotation means 140-1 to 140-N rotate the phases of the plurality of digital signal sequences respectively based on the phase rotation amounts.

In the received signal processor 100 according to the present example embodiment, the symbol-map-rotation determination means 130 determines the respective phase rotation amounts of a plurality of digital signal sequences from the respective signal-to-noise ratios of the plurality of digital signal sequences in which only the relative phase errors have been corrected, and from a plurality of corresponding symbol signal sequences. The above-mentioned configuration makes it possible to enhance the probability of performing the maximal ratio combining by matching the phases of the respective digital signal sequences (modes) and to reduce the error rates of bit sequences obtained as output. That is to say, according to the received signal processor 100 of the present example embodiment, it is possible to obtain an appropriate synthesized signal from a plurality of digital signals in which only relative phase errors of a plurality of received signals have been corrected.

The symbol-map-rotation determination means 130 can be configured to determine the respective phase rotation amounts in order to match, to the phase of the digital signal sequence with the highest signal-to-noise ratio among the plurality of digital signal sequences, the phases of the other digital signal sequences. This is because a digital signal sequence with the highest signal-to-noise ratio can be estimated to be most accurate.

For symbol signal sequences corresponding to digital signal sequences with their signal-to-noise ratios equal to or lower than a predetermined threshold, the symbol-map-rotation determination means 130 determines the phase rotation amounts from a plurality of symbol signal sequences and the respective signal-to-noise ratios of the plurality of digital signal sequences, as mentioned above. For symbol signal sequences corresponding to digital signal sequences with their signal-to-noise ratios higher than the predetermined threshold, the symbol-map-rotation determination means 130 can be configured to determine to set the phase rotation amount at a value already calculated. That is to say, the symbol-map-rotation determination means 130 can use the same value as the phase rotation amount determined previously when the signal-to-noise ratio is equal to or higher than a certain level. In this case, because the processing operation on a digital signal sequence with the signal-to-noise ratio higher than the predetermined threshold can be stopped, the power consumption of the received signal processor 100 can be reduced.

Next, a method for processing a received signal according to the present example embodiment will be described.

In the method for processing a received signal according to the present example embodiment, first, the respective signal-to-noise ratios of a plurality of digital signal sequences in which the relative phase errors of a plurality of received signal sequences have been corrected, are estimated. A plurality of symbol signal sequences are generated by performing symbol decisions of the plurality of digital signal sequences. The respective phase rotation amounts of the plurality of digital signal sequences are determined from the plurality of symbol signal sequences and the respective signal-to-noise ratios of the plurality of digital signal sequences. Lastly, the phases of the plurality of digital signal sequences are rotated based on the phase rotation amounts, respectively.

In determining the phase rotation amounts, the respective phase rotation amounts can be determined in order to match, to the phase of the digital signal sequence with the highest signal-to-noise ratio among the plurality of digital signal sequences, the phases of the other digital signal sequences.

As described above, according to the received signal processor 100 and the method for processing a received signal of the present example embodiment, it is possible to obtain an appropriate synthesized signal from a plurality of digital signals in which only relative phase errors of a plurality of received signals have been corrected.

Second Example Embodiment

Figure 2:
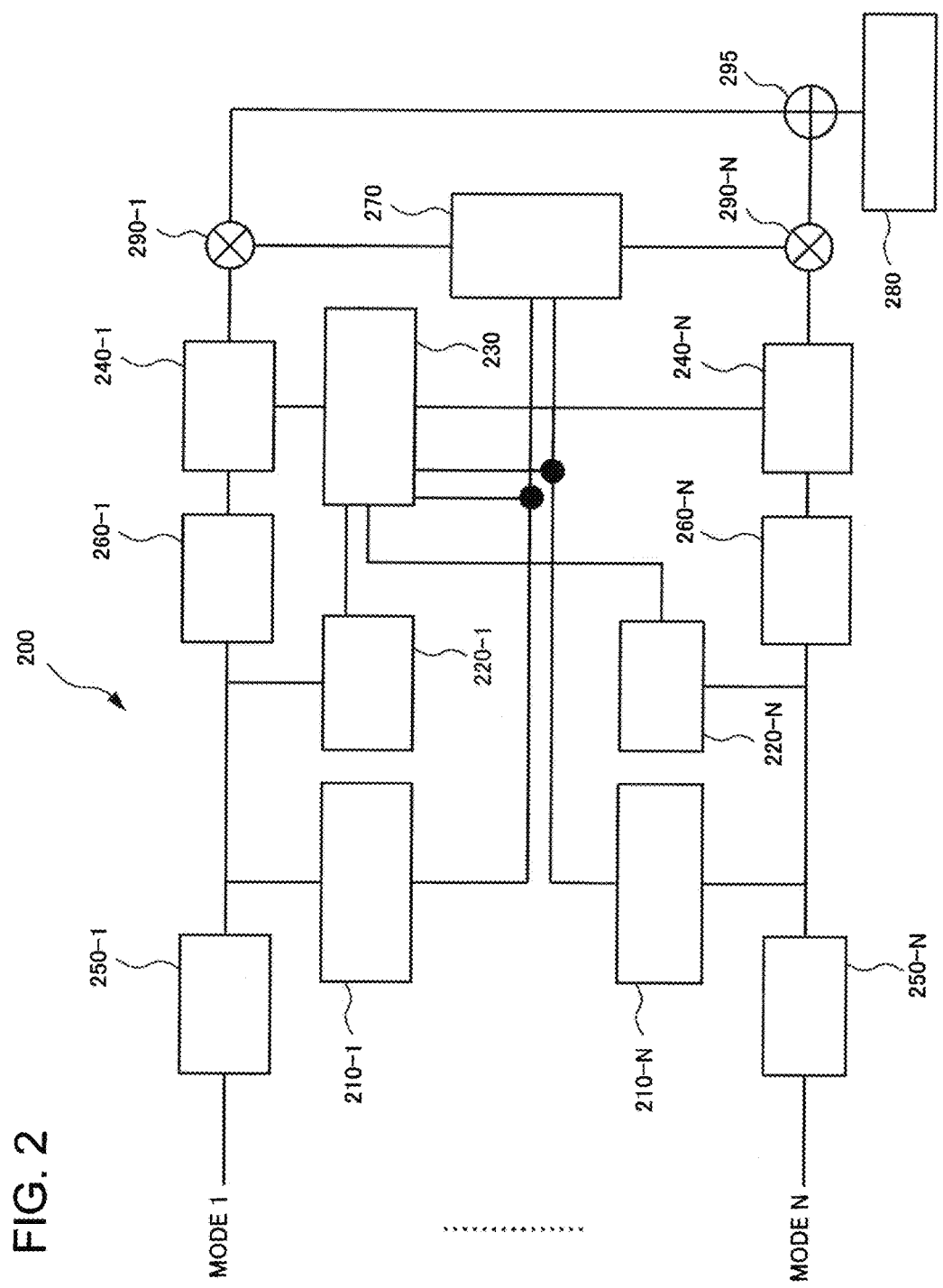
FIG. 2 is a block diagram illustrating the configuration of a received signal processor according to a second example embodiment of the present invention.

Next, a second example embodiment of the present invention will be described. FIG. 2 is a block diagram illustrating the configuration of a received signal processor 200 according to the second example embodiment of the present invention.

The received signal processor 200 includes a plurality of signal-to-noise ratio estimation means 210-1 to 210-N, a plurality of temporary decision means 220-1 to 220-N, a symbol-map-rotation determination means 230, and a plurality of phase rotation means 240-1 to 240-N. The above-mentioned configuration is similar to that of the received signal processor 100 according to the first example embodiment.

The received signal processor 200 further includes phase correction means 250-1 to 250-N, delay means 260-1 to 260-N, a weight calculation means 270, a decision means 280, multipliers (multiplication means) 290-1 to 290-N, and an adder (addition means) 295.

The phase correction means 250-1 to 250-N receive input of a plurality of (N) received signal sequences (mode 1 to mode N), detect relative phase errors, and output a plurality of (N) digital signal sequences in which the relative phase errors have been corrected. The signal-to-noise ratio estimation means 210-1 to 210-N estimate the respective signal-to-noise ratios of the N digital signal sequences (mode 1 to mode N) in which the relative phase errors of the N received signal sequences have been corrected. The temporary decision means 220-1 to 220-N perform symbol decisions on the N digital signal sequences and output symbol signal sequences.

The symbol-map-rotation determination means 230 determines the respective phase rotation amounts of the plurality of digital signal sequences from the N symbol signal sequences and the respective signal-to-noise ratios of the N digital signal sequences. In this case, the symbol-map-rotation determination means 230 determines the respective phase rotation amounts in order to match, to the phase of the digital signal sequence with the highest signal-to-noise ratio among the N digital signal sequences, the phases of the other digital signal sequences. The delay means 260-1 to 260-N delay the digital signal sequences depending on the processing times of the signal-to-noise ratio estimation means 210-1 to 210-N and the symbol-map-rotation determination means 230.

The phase rotation means 240-1 to 240-N rotate the phases of the N digital signal sequences based on the phase rotation amounts, respectively. The weight calculation means 270 calculates weights each of which is a ratio of each signal-to-noise ratio to the maximum value of the signal-to-noise ratios. That is to say, the weight calculation means 270 determines a combining ratio of each mode based on N signal-to-noise ratios calculated by the signal-to-noise ratio estimation means 210-1 to 210-N. The multipliers 290-1 to 290-N multiply the weights by second digital signal sequences output from the phase rotation means 240-1 to 240-N, respectively.

The adder 295 calculates the sum of N weighted digital signals output from the N multipliers 290-1 to 290-N. The decision means 280 performs symbol decision from the signal output from the adder 295.

Next, the operation of each means constituting the received signal processor 200 will be described in more detail using the received signal processor 200 in a free space optical receiver as an example.

The phase correction means 250-1 to 250-N correct the effect of the atmospheric fluctuations on the phase of an optical signal, the effect of a Doppler shift due to the movement of the transmitter, and frequency and phase noise of local light. In this case, the above-mentioned DD-PLL method or the like can be used. However, as described above, only the relative phase error can be corrected by the DD-PLL method. Accordingly, even when the signal-to-noise ratios of all modes 1 to N are higher than a predetermined value, and the transmitter continuously transmits the same symbol (0, 0), a certain mode can be locked at (0, 0) whereas another mode can be locked at a different symbol such as (0, 1).

Figure 3:
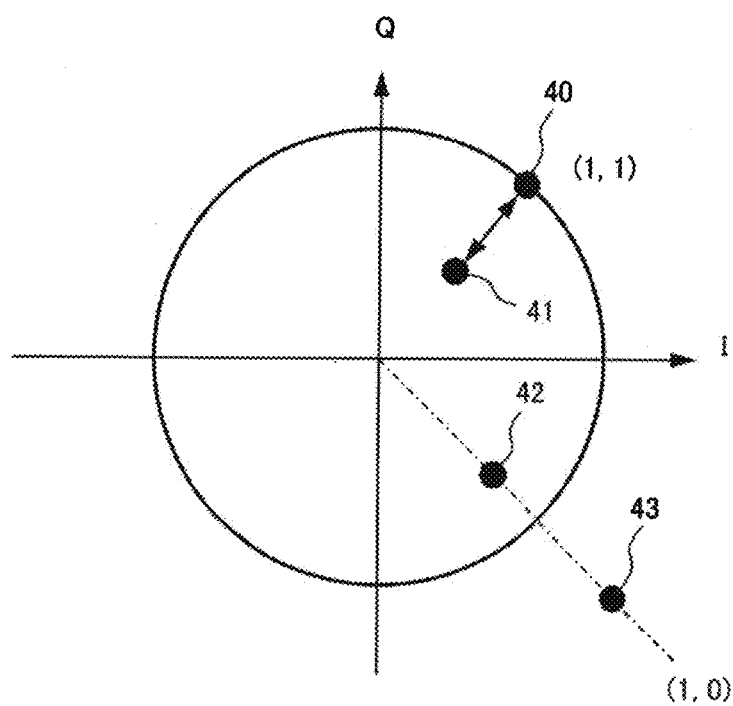
FIG. 3 is a constellation diagram to explain the operation of signal-to-noise ratio estimation means included in the received signal processor according to the second example embodiment of the present invention.

The signal-to-noise ratio estimation means 210-1 to 210-N estimate the signal-to-noise ratios from digital signal sequences output by the phase correction means 250-1 to 250-N. The operation of the signal-to-noise ratio estimation means 210-1 to 210-N will be described specifically below with reference to a constellation diagram illustrated in FIG. 3.

For example, if there are not noise at all in PSK modulation, symbols are arranged circumferentially; consequently, the signal power can be regarded as constant. In this case, the noise power can be calculated as the square of the distance between a received symbol point 41 and an ideal symbol point 40 nearest to it. According to such a calculation method, it is easy to calculate signal power; consequently, the calculation method can be easily implemented.

In the free space optical communication, the optical receiving intensity can vary depending on the state of the atmosphere. Further, in the free space optical communication, signal light cannot enter a telescope included in the free space optical receiver at all, but only noise can enter it. Especially, because a transmitting side is moving in the communication with a mobile object, the above-mentioned situation occurs if the transmitter does not know the orientation of the receiver accurately, or conversely, if the receiver does not know the orientation of the transmitter accurately. In this case, even an ideal signal without phase noise can be located at a received symbol point 42 or 43 in FIG. 3.

Figure 4:
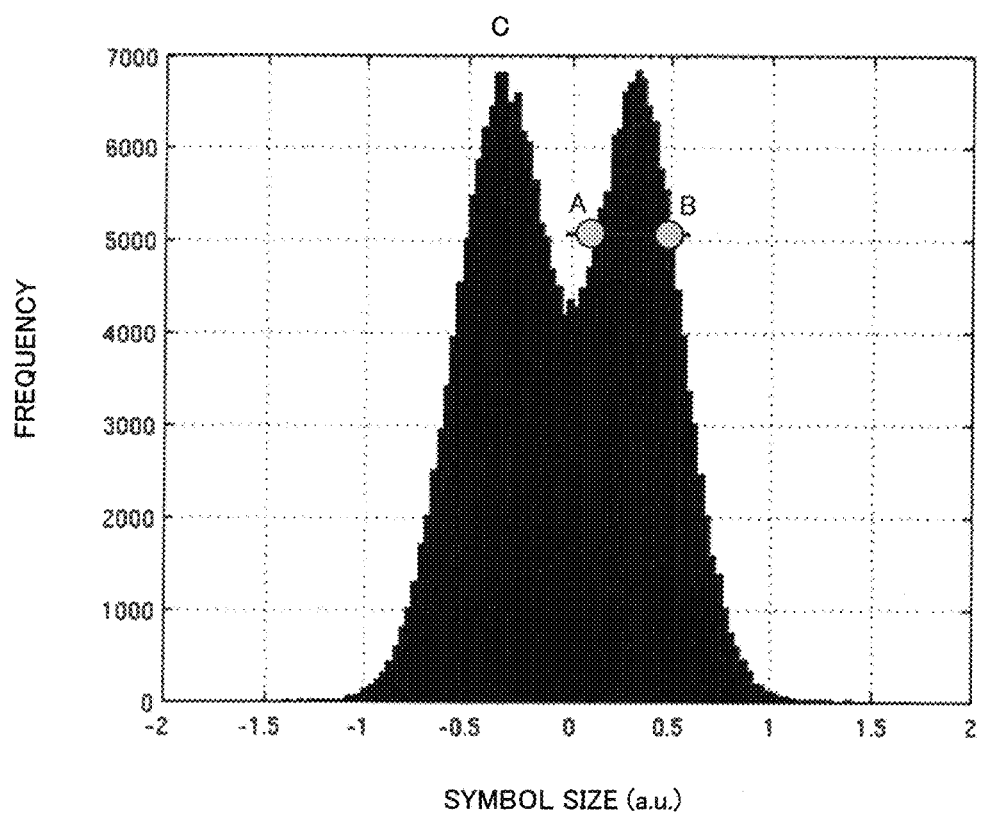
FIG. 4 is a histogram to explain the operation of the signal-to-noise ratio estimation means included in the received signal processor according to the second example embodiment of the present invention.

In such a case, the symbol position can be determined by making a histogram illustrated in FIG. 4, for example. The vertical axis of FIG. 4 represents a frequency, and the horizontal axis represents a symbol size in an I (In-phase) plane. FIG. 4 illustrates the results from making a histogram using one hundred thousand symbols. In this case, a position (C) at which the frequency is highest can be determined as the symbol position. Alternatively, the center value ((A+B)/2) using a certain frequency (5000 in FIG. 4) as a threshold may be determined as the symbol position. In this case, the noise power can be defined as the square of the distance between the symbol position of the signal determined as described above and each received symbol.

Because atmospheric fluctuation occurs mainly due to a flow of the atmosphere, the optical intensity of signal light varies in the order of several ten kilohertz (kHz) to several kilohertz (kHz). Consequently, the symbol position of an ideal signal without phase noise varies in the order of 100 microseconds (µs). As a result, if the symbol position is determined by making a histogram, it is necessary to estimate the signal-to-noise ratio by making a histogram in the order of 10 microseconds (µs) to 100 microseconds (µs).

Figure 15:
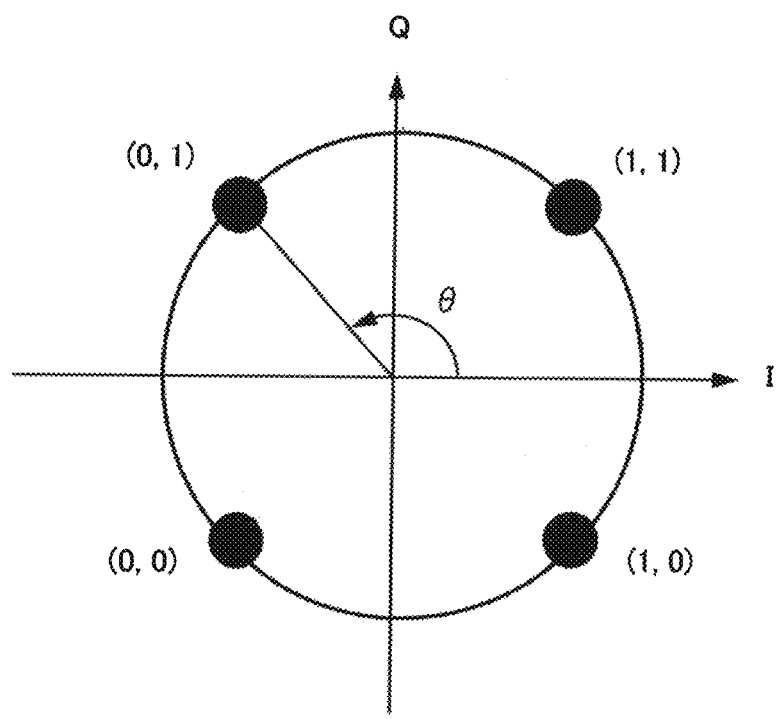
FIG. 15 is a constellation diagram for a QPSK signal.

The temporary decision means 220-1 to 220-N perform symbol decisions on digital signal sequences output from the phase correction means 250-1 to 250-N. If the signal is a QPSK signal, for example, a symbol positioned in the first quadrant is judged to be (1, 1), a symbol p positioned in the second quadrant is judged to be (0, 1), a symbol positioned in the third quadrant is judged to be (0, 0), and a symbol positioned in the fourth quadrant is judged to be (1, 0), as illustrated in FIG. 15. That is to say, in FIG. 3, the received symbol point 41 is judged to be an ideal symbol point 40. The bit sequence of each mode is calculated by the above-described operation of the temporary decision means 220-1 to 220-N.

If the symbol-map-rotation determination means 230 determines that the phase rotation amount is "0", the phase rotation means 240-1 to 240-N multiply digital signals in the respective modes by exp(−jθ) and output the results. The symbol-map-rotation determination means 230 appropriately estimates the phase rotation amount θ; as a result, digital signals with every mode in phase with each other are output from the phase rotation means 240-1 to 240-N. In the operation of the phase rotation means 240-1 to 240-N, the conjugate value (arg(h*)) of the phase component of the transfer function h required in the maximal ratio combining is multiplied.

The multipliers 290-1 to 290-N multiply second digital signals A (complex numbers) output from the phase rotation means 240-1 to 240-N and the weights W (real numbers) in the respective modes calculated by the weight calculation means 270, and output the results WA. In the operation of the multipliers 290-1 to 290-N, an amplitude part is multiplied using the maximal ratio combining, that is, the amplitude component (|h*|) of the transfer function h is multiplied.

The adder 295 calculates the sum of weighted digital signals (complex numbers) output from the N multipliers 290-1 to 290-N.

Figure 5:
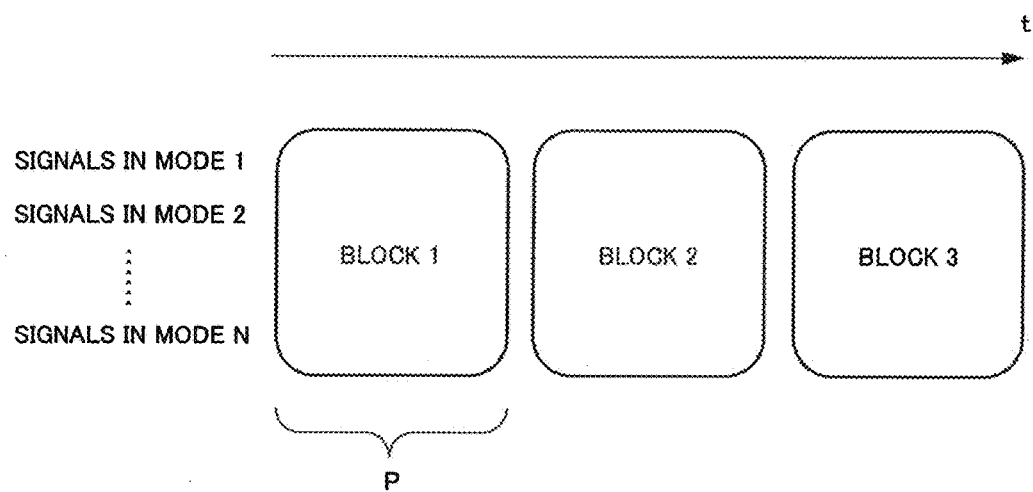
FIG. 5 is a diagram to explain the operation of the signal-to-noise ratio estimation means included in the received signal processor according to the second example embodiment of the present invention.

The symbol-map-rotation determination means 230 determines the rotation amounts of the phases of digital signals in the respective modes. The symbol-map-rotation determination means 230 separates a digital signal sequence in each mode on the time axis t by P pieces, and processes the digital signals separating them into blocks each of which including N×P pieces, as illustrated in FIG. 5.

Next, the processing of each block by the symbol-map-rotation determination means 230 will be described with reference to FIG. 6. The symbol-map-rotation determination means 230, first, determines a mode with the highest signal-to-noise ratio from the respective signal-to-noise ratios estimated by the N signal-to-noise ratio estimation means 210-1 to 210-N. FIG. 6 illustrates, on the uppermost row, respective phases $A_i$ (i=1, . . . , P) of a symbol signal sequence in the mode with the highest signal-to-noise ratio output from the temporary decision means 220, along the time axis t. The phase difference is determined with respect to each symbol signal sequence from the difference ($B_i-A_i$) between respective phases $A_i$ (i=P) of symbol signal sequences in the mode with the highest signal-to-noise ratio and respective phases $B_i$ (i=P; on the second row of FIG. 6) of symbol signal sequences in other mode.

For a mode with the signal-to-noise ratio equal to or higher than a predetermined threshold, a value determined in the previous block processing is used without change as the phase difference.

In contrast, for a mode with the signal-to-noise ratio lower than the predetermined threshold, the phase difference is determined with respect to each mode by the following processing. That is to say, the sum of the above-mentioned respective phase differences ($B_i-A_i$) is divided by P, and then a remainder is calculated when further divided by 2n. If an M-valued PSK signal is used as the digital signal, the phase difference for each mode is defined as zero when the remainder is 0 to π/M or (2M−1)π/M to 2n. If the remainder is (2n−3)π/M to (2n−1)π/M, the phase difference for each mode is determined to be (2n−2)π/M. Here, "n" represents a natural number between two and M, inclusive.

FIG. 6 illustrates the case of a QPSK signal (M=4). In this example, the symbol-map-rotation determination means 230 determines that the phase difference in a mode X is equal to π/2. The symbol-map-rotation determination means 230 collectively processes P symbols as described above, which makes it possible to reduce the influence of occurrence of a random error for each bit.

The phase rotation means 240-1 to 240-N rotate the phases of digital signal sequences in mode X by −π/2 to correct the phase difference π/2 determined by the symbol-map-rotation determination means 230. This makes it possible to match the phase C (on the fourth row of FIG. 6) after phase rotation of the digital signal sequence in the mode X with the phase A of the digital signal sequence in the mode with the highest signal-to-noise ratio.

Because the atmospheric fluctuation varies in the order of several ten kilohertz (kHz) to several kilohertz (kHz) as described above, it is necessary to process P symbols in the time from 10 microseconds (µs) to 100 microseconds (µs) that is shorter than the above.

As mentioned above, the symbol-map-rotation determination means 230 can absorb the difference in initial lock position in the DD-PLL method.

It is not necessary for the signal-to-noise ratio estimation means 210-1 to 210-N and the symbol-map-rotation determination means 230 to use all the data inputted into the received signal processor 100. The input data used by the signal-to-noise ratio estimation means 210-1 to 210-N or the symbol-map-rotation determination means 230 may be thinned out based on an allowable estimation error. That is to say, the signal-to-noise ratio estimation means 210-1 to 210-N can be configured to estimate the signal-to-noise ratios from part of the plurality of digital signal sequences. The symbol-map-rotation determination means 230 can be configured to determine the phase rotation amounts from part of the plurality of symbol signal sequences. These configurations make it possible to reduce the circuit size of the received signal processor 100.

The weight calculation means 270 calculates weights in respective modes from the signal-to-noise ratios of the digital signals in the respective modes that the signal-to-noise ratio estimation means 210-1 to 210-N have estimated. If the maximal ratio combining is performed, the weight in each mode can be defined as $SNR_i/SNR_{max}$, where $SNR_i$ represents the signal-to-noise ratio in each mode. Here, $SNR_{max}$ represents the highest signal-to-noise ratio among the signal-to-noise ratios of the digital signals in all modes. There may be an occasion where the signal-to-noise ratio estimation means 210-1 to 210-N cannot estimate the signal-to-noise ratios mainly because of the large amount of noise. In this occasion, the weight calculation means 270 outputs zero as the weight. This makes it possible to prevent signals composed of only noise from being combined.

The decision means 280 performs the symbol decision based on the digital signal output from the adder 295. The decision means 280 may perform a hard decision as with the temporary decision means 220-1 to 220-N, or perform a soft decision. An error correction means may be disposed in a stage preceding the decision means 280. If a training symbol is used, a means for removing the training symbol can be provided. If differential encoding is used, a block to perform differential decoding may be disposed.

The delay means 260-1 to 260-N delay digital signals in respective modes until the signal-to-noise ratio estimation means 210-1 to 210-N and the symbol-map-rotation determination means 230 output processing results. This makes it possible to correct and combine respective digital signals using the phase rotation amount and the weight calculated for each mode.

Figure 7:
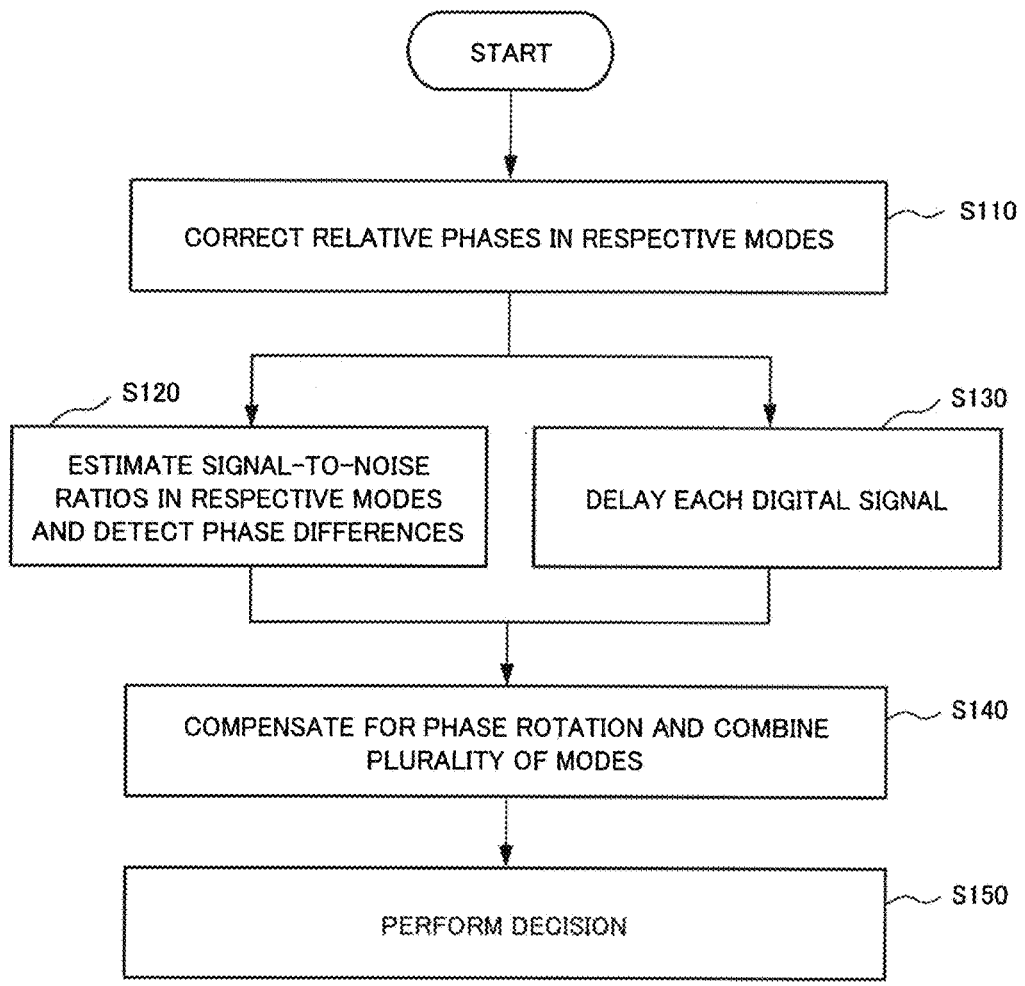
FIG. 7 is a flowchart to explain the operation of the received signal processor according to the second example embodiment of the present invention.

Next, the operation of the received signal processor 200 will be described. FIG. 7 is a flowchart to explain the operation of the received signal processor 200.

In the following description, focusing on one arbitrary input block, that is, one block including N×P data illustrated in FIG. 5, it will be described to process the block. In the received signal processor 200, all means operate in parallel with pipeline processing.

In the received signal processor 200, first, the N phase correction means 250-1 to 250-N correct the relative phases of the digital signals in respective modes (step S110).

Next, the N signal-to-noise ratio estimation means 210-1 to 210-N estimate the signal-to-noise ratios of the respective digital signals output from the N phase correction means 250-1 to 250-N. At the same time, the temporary decision means 220-1 to 220-N and the symbol-map-rotation determination means 230 detect the phase differences in the digital signals in respective modes included in a block X (step S120). In this case, both of the signal-to-noise ratio estimation means 210-1 to 210-N and the symbol-map-rotation determination means 230 process P data included in the block X; consequently, they spend a time corresponding to at least P symbols on the process. More specifically, the processing time to make the histogram illustrated in FIG. 4 is required.

The delay means 260-1 to 260-N delay the digital signals in respective modes until the signal-to-noise ratio estimation means 210-1 to 210-N and the symbol-map-rotation determination means 230 output the calculation results (step S230). This makes it possible to use phase rotation amounts and weights calculated from the digital signals in the block X for the phase rotation and the combining processing.

Then the phase rotation means 240-1 to 240-N rotate the phases of the digital signals output from the phase correction means 250-1 to 250-N based on the phase rotation amounts in respective modes calculated by the symbol-map-rotation determination means 230. The second digital signals output from the phase rotation means 240-1 to 240-N respectively are weighted in the multipliers 290-1 to 290-N using the weights calculated by the weight calculation means 270. After that, these signals are summed in the adder 295A, and the plurality of modes are combined (step S140).

Lastly, the decision means 280 performs symbol decision based on the signal output from the adder 295 (step S150).

As mentioned above, in the received signal processor 200 according to the present example embodiment, the symbol-map-rotation determination means 230 determines the phase rotation amounts in order to match, to the phase of the digital signal sequence with the highest signal-to-noise ratio among N digital signal sequences, the phases of the other digital signal sequences. The above-mentioned configuration makes it possible to enhance the probability of performing the maximal ratio combining by matching the phases of the respective digital signal sequences (modes) and to reduce the error rates of bit sequences obtained as output. That is to say, according to the received signal processor 100 of the present example embodiment, it is possible to obtain an appropriate synthesized signal from a plurality of digital signals in which only relative phase errors of a plurality of received signals have been corrected.

In the received signal processor 200 according to the present example embodiment, the symbol-map-rotation determination means 230 uses without change a value determined in the previous block processing as the phase difference for a mode with the signal-to-noise ratio equal to or higher than a predetermined threshold. That is to say, the symbol-map-rotation determination means 230 is configured to use the same value as the phase rotation amount determined previously when the signal-to-noise ratio is equal to or higher than a certain level. In this case, because the processing operation on a digital signal sequence with the signal-to-noise ratio higher than the predetermined threshold can be stopped, the power consumption of the received signal processor 200 can be reduced.

In addition, in the received signal processor 200 according to the present example embodiment, the symbol-map-rotation determination means 230 determines the phase difference with respect to each mode from the symbol signal sequences output from the temporary decision means 220-1 to 220-N for a mode with the signal-to-noise ratio lower than the predetermined threshold. This enables the symbol-map-rotation determination means 230 to absorb the symbol rotation due to the cycle slip to a certain extent even though the DD-PLL used in the phase correction means 250-1 to 250-N causes a cycle slip in a certain mode.

Third Example Embodiment

Figure 8:
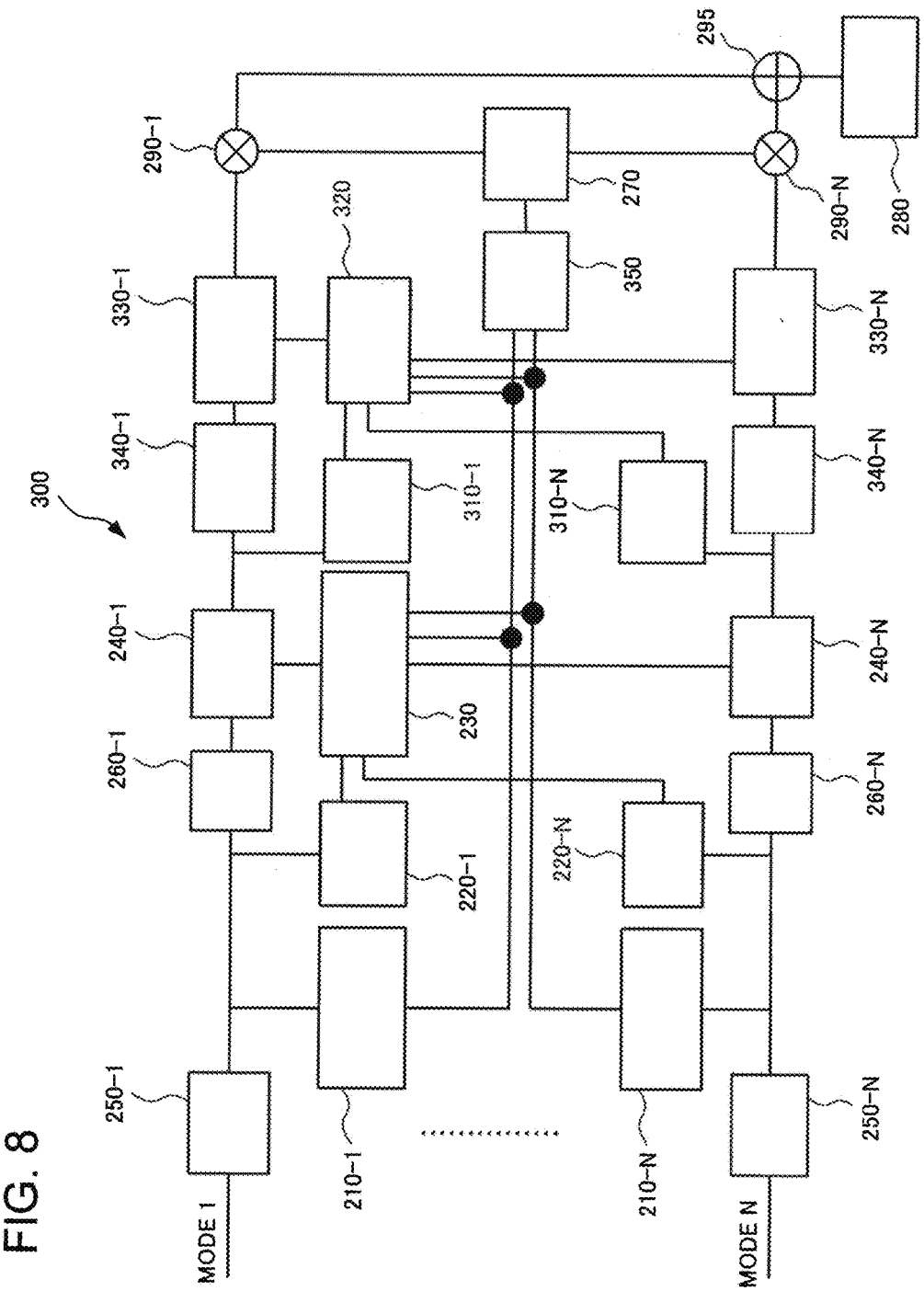
FIG. 8 is a block diagram illustrating the configuration of a received signal processor according to a third example embodiment of the present invention.

Next, a third example embodiment of the present invention will be described. FIG. 8 is a block diagram illustrating the configuration of a received signal processor 300 according to the third example embodiment of the present invention.

The received signal processor 300 includes a plurality of signal-to-noise ratio estimation means 210-1 to 210-N, a plurality of temporary decision means 220-1 to 220-N, a symbol-map-rotation determination means 230, and a plurality of phase rotation means 240-1 to 240-N. The received signal processor 300 also includes phase correction means 250-1 to 250-N, delay means 260-1 to 260-N, a weight calculation means 270, a decision means 280, multipliers (multiplication means) 290-1 to 290-N, and an adder (addition means) 295. The above-mentioned configurations are similar to those of the received signal processor 200 according to the second example embodiment; accordingly, detail descriptions of those means will not be repeated.

The received signal processor 300 further includes a plurality of second temporary decision means 310-1 to 310-N, a cycle-slip detection means 320, and a plurality of cycle-slip compensation means 330-1 to 330-N.

The second temporary decision means 310-1 to 310-N perform symbol decisions of the second digital signal sequences output from the phase rotation means 240-1 to 240-N and output second symbol signal sequences. The cycle-slip detection means 320 detects cycle slips in the second digital signal sequences based on a second symbol signal sequence corresponding to the digital signal sequence with the highest signal-to-noise ratio, of the plurality of second symbol signal sequences. The cycle-slip compensation means 330-1 to 330-N perform processing for compensating for phase rotation due to the detected cycle slips, on the plurality of second digital signal sequences, respectively. The multipliers 290-1 to 290-N multiply the weights calculated by the weight calculation means 270 and third digital signal sequences output from the cycle-slip compensation means 330-1 to 330-N together, respectively.

According to the received signal processor 300 of the present example embodiment, as with the second example embodiment, the above-described configuration makes it possible to obtain an appropriate synthesized signal from a plurality of digital signals in which only relative phase errors of a plurality of received signals have been corrected. The received signal processor 300 according to the present example embodiment further includes the symbol-map-rotation determination means 230 and the cycle-slip detection means 320. The symbol-map-rotation determination means 230 estimates the difference in initial lock due to the DD-PLL used in the phase correction means 250-1 to 250-N, and the cycle-slip detection means 320 detects cycle slips. This makes it possible to reduce the circuit size compared to the implementation of both means in one circuit.

The received signal processor 300 can be configured to include second delay means 340-1 to 340-N and a third delay means 350. The second delay means 340-1 to 340-N delay the second digital signal sequences output from the phase rotation means 240-1 to 240-N, depending on the processing time of the cycle-slip detection means 320. The third delay means 350 delays the signals output from the signal-to-noise ratio estimation means 210-1 to 210-N, depending on the processing time of the cycle-slip detection means 320.

The cycle slip phenomenon will be further described below with reference to FIG. 15. The cycle slip phenomenon is a phenomenon in which the lock of DD-PLL temporarily comes off, resulting in being locked at another symbol, as described above. In other words, it is a phenomenon in which the lock of DD-PLL shifts to (0, 1) or (1, 0) while the transmitter continues transmitting a symbol to which bit sequence (1, 1) is allocated, and the phase rotation means 240-1 to 240-N also continues receiving bit sequence (1, 1). This phenomenon is likely to occur if the received signal inputted into the DD-PLL has a large amount of noise. If this phenomenon occurs, digital signals differing in phase are combined, as mentioned above; consequently, it causes to deteriorate the synthesized results.

Next, the operation of each means constituting the received signal processor 300 will be described in more detail.

The second delay means 340-1 to 340-N delay second digital signals in respective modes by the time required for the cycle-slip detection means 320 to calculate calculation results after receiving data. As will become apparent below, because only a few symbols are required to detect cycle slips, each circuit size of the cycle-slip detection means 320, the second delay means 340-1 to 340-N, and the third delay means 350 can be small.

The second temporary decision means 310-1 to 310-N perform the symbol decision from the second digital signals output from the phase rotation means 240-1 to 240-N. The operation in this case is similar to that of the temporary decision means 220-1 to 220-N.

Figure 9:
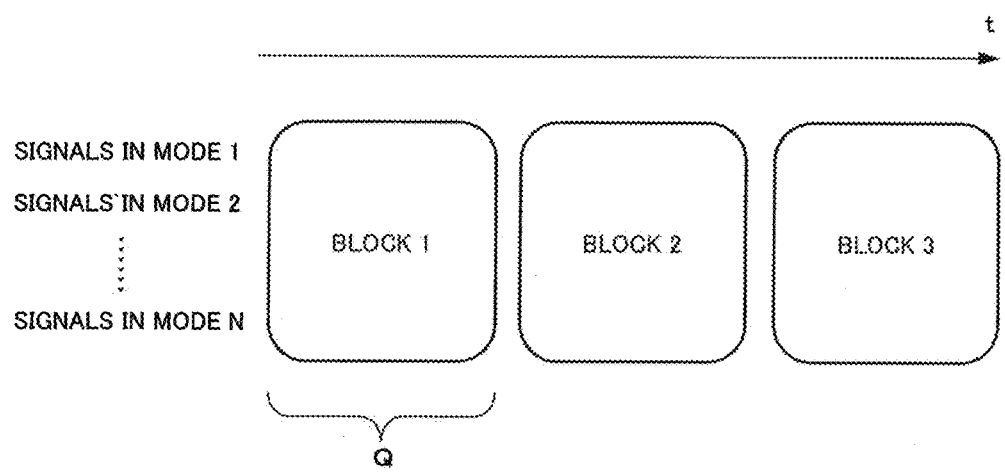
FIG. 9 is a diagram to explain the operation of a cycle-slip detection means included in the received signal processor according to the third example embodiment of the present invention.

The cycle-slip detection means 320 detects where or whether or not a cycle slip has occurred in digital signals of respective modes from the symbol signal sequences. The cycle-slip detection means 320 separates a digital signal sequence in each mode on the time axis t by Q pieces, and processes the digital signals separating them into blocks each of which including N×Q pieces, as illustrated in FIG. 9.

Next, the processing of each block by the cycle-slip detection means 320 will be described with reference to FIG. 10. Here, the processing performed on the digital signal based on the M-PSK modulation scheme will be used as an example.

The cycle-slip detection means 320, first, determines a mode with the highest signal-to-noise ratio from the respective signal-to-noise ratios estimated by the N signal-to-noise ratio estimation means 210-1 to 210-N. FIG. 10 illustrates, on the uppermost row, a symbol pattern in the mode with the highest signal-to-noise ratio.

FIG. 10 illustrates, on the second row, a symbol pattern with no cycle slip among the Q signals. This represents a symbol pattern itself output from each of the second temporary decision means 310-1 to 310-N assuming the phase difference to be zero.

FIG. 10 illustrates, on the third and subsequent rows, symbol patterns if a positive or negative cycle slip has occurred in each of the first to Q-th symbols. FIG. 10 illustrates symbol patterns based on the QPSK modulation scheme, where Q is equal to four.

The cycle-slip detection means 320 compares each symbol pattern and the symbol pattern with the highest signal-to-noise ratio (on the first row), and detects a best-matched symbol pattern. In the example illustrated in FIG. 10, a pattern that cycle-slips by $-\pi/M$ in the third symbol (the third symbol on the negative side) fits a pattern with the highest signal-to-noise ratio. Consequently, the cycle-slip detection means 320 instructs the corresponding cycle-slip compensation means 330-X to rotate the phase by $+\pi/M$ for the third and subsequent symbols in order to compensate for the phase rotation due to the cycle slip.

The cycle-slip detection means 320 performs the above-mentioned processing on digital signals in all modes. In this manner, the cycle-slip detection means 320 compensates for the cycle slip phenomenon that arises mainly in the DD-PLL.

The cycle-slip detection means 320 lists all patterns and detects a pattern with the highest signal-to-noise ratio among all the patterns; accordingly, its circuit size becomes relatively large. As a result, it is better for the number Q of symbols included in the processing block to be small, and it is preferable for the number Q to be equivalent to the degree of parallelism of the processing circuit. In optical communications, in general, 10 gigabits per second (Gbps) signals, for example, are processed by an LSI (large scale integration) or an FPGA (field programmable gate array) that operates at 1 GHz at the most. This makes it necessary to process signals in parallel. The degree of parallelism represents the number of parallel processes, and at least ten parallel processes are required in order to process 10-Gbps signals by an LSI that operates at 1 GHz.

The cycle-slip detection means 320 may detect cycle slips using part of a plurality of second symbol signal sequences. That is to say, not all symbol patterns are listed, but only four rows may be used that includes the first rows on the positive and negative sides and the third rows on the positive and negative sides, skipping over a row, in FIG. 10, for example. The present example embodiment is not limited to this, but symbol patterns skipping over two rows or N rows may be used. In this case, it is impossible to estimate the position of the cycle slip accurately, but possible to reduce the circuit size. If symbol patterns are used skipping over a row, the second and fourth cycle slips, for example, are missed; however, this has an insignificant effect because an erroneous decision occurs at only one position. If a cycle slip occurs in the fourth symbol on the positive side, for example, the cycle slip is determined to have occurred in the third symbol on the positive side; consequently, the first, second, and third symbols are accurately corrected, and only the fourth symbol suffers an error.

Defining the phase rotation amount in each mode determined by the cycle-slip detection means 320 as "θ", each of the cycle-slip compensation means 330-1 to 330-N multiplies digital signal A in each mode by exp(−jθ) and outputs the resultant signal. The cycle-slip detection means 320 appropriately estimates the phase rotation amount θ, which enables the cycle-slip compensation means 330-1 to 330-N to output digital signals perfectly in phase for respective modes even when a cycle slip occurs.

The third delay means 350 delays the signal-to-noise ratios of the respective digital signals calculated by the signal-to-noise ratio estimation means 210-1 to 210-N by the same amount as that in the second delay means 340-1 to 340-N and transmits them to the weight calculation means 270. This makes it possible to supply weights in combining at appropriate timings to digital signal sequences whose signal-to-noise ratios have been estimated.

Figure 11:
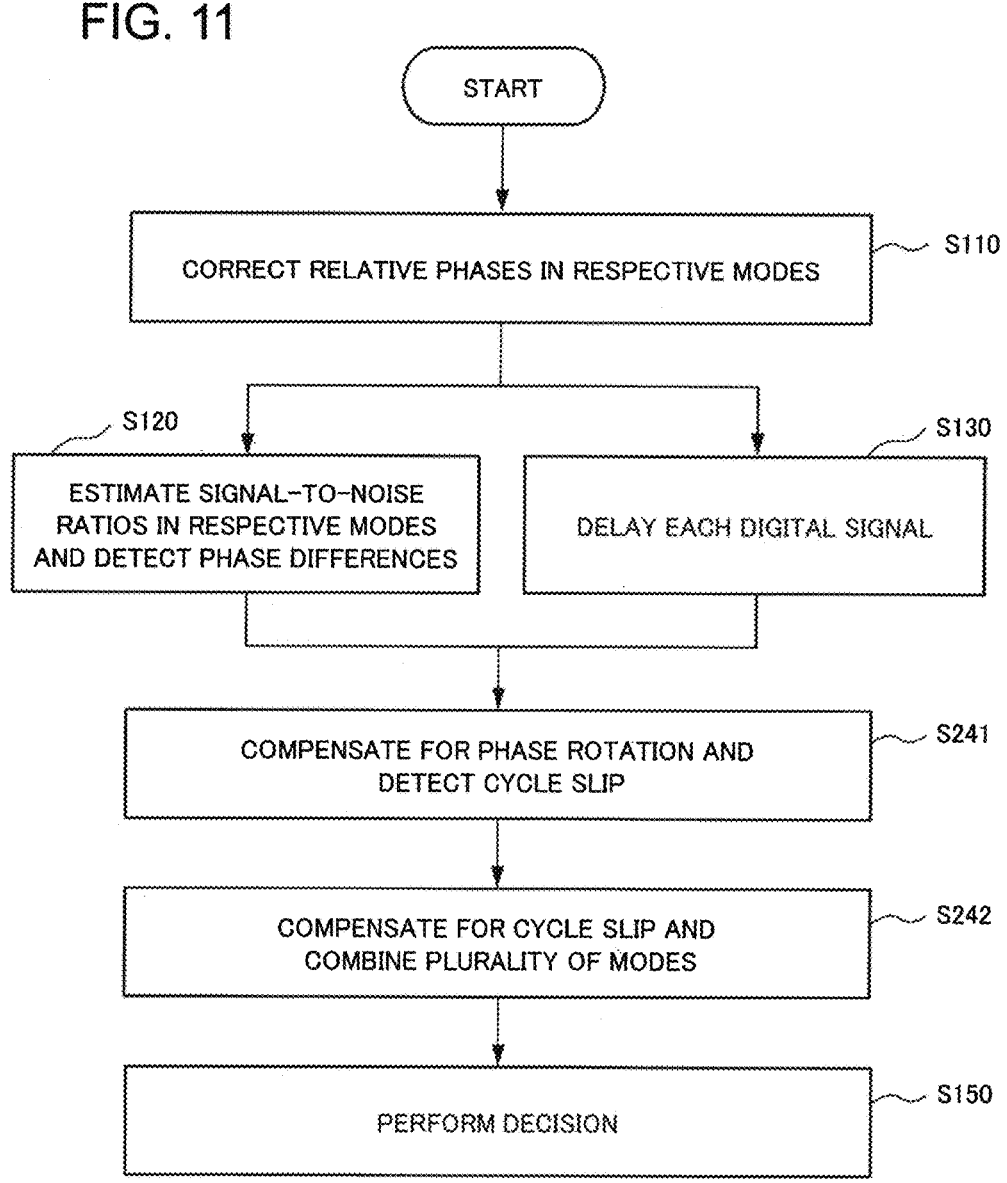
FIG. 11 is a flowchart to explain the operation of the received signal processor according to the third example embodiment of the present invention.

Next, the operation of the received signal processor 300 will be described. FIG. 11 is a flowchart to explain the operation of the received signal processor 300. The operations in steps S110, S120, S130, and S150 are similar to those of the received signal processor 200 according to the second example embodiment; consequently, their descriptions will not be repeated.

The phase rotation means 240-1 to 240-N compensate for phase rotation by rotating the phases of digital signals and output second digital signal sequences. The cycle-slip detection means 320 detects a cycle slip in the second digital signal sequences (step S141). In this case, the second digital signal sequences after phase rotation compensation are stored in the second delay means 340-1 to 340-N. In contrast, the signal-to-noise ratios in respective modes estimated by the signal-to-noise ratio estimation means 210-1 to 210-N are stored in the third delay means 350.

The cycle-slip compensation means 330-1 to 330-N rotate the phases of the second digital signals output from the second delay means 340-1 to 340-N based on the phase rotation amounts in respective modes detected by the cycle-slip detection means 320. This makes it possible to compensate for phase rotation due to the cycle slip. Third digital signals output from the cycle-slip compensation means 330-1 to 330-N are weighted in the multipliers 290-1 to 290-N using weights calculated by the weight calculation means 270. After that, these signals are summed in the adder 295, and a plurality of modes are combined (step S242).

As mentioned above, in the received signal processor 300 according to the present example embodiment, the cycle-slip detection means 320 detects the cycle slip in respective modes, and the cycle-slip compensation means 330-1 to 330-N compensate for the cycle slip. Those configurations make it possible to compensate for the cycle slip occurring in the DD-PLL more accurately. As a result, according to the received signal processor 300 of the present example embodiment, it is possible to obtain an appropriate synthesized signal from a plurality of digital signals in which only relative phase errors of a plurality of received signals have been corrected.

In the received signal processor 300 according to the present example embodiment, the phase rotation means 240-1 to 240-N are configured to compensate for initial symbol locks due to the DD-PLL, and the cycle-slip compensation means 330-1 to 330-N are configured to compensate for cycle slips. This makes it possible to reduce the circuit size compared to the case where both of them are compensated for simultaneously. The reason is as follows: if they are compensated for simultaneously, it is necessary to estimate an optimum symbol pattern, listing M×(2P+1) patterns for digital signals based on the M-PSK modulation scheme. In contrast, according to the received signal processor 300 according to the present example embodiment, it is possible to compensate for them by processing (2Q+1) (Q<P) symbol patterns only.

Fourth Example Embodiment

Figure 12:
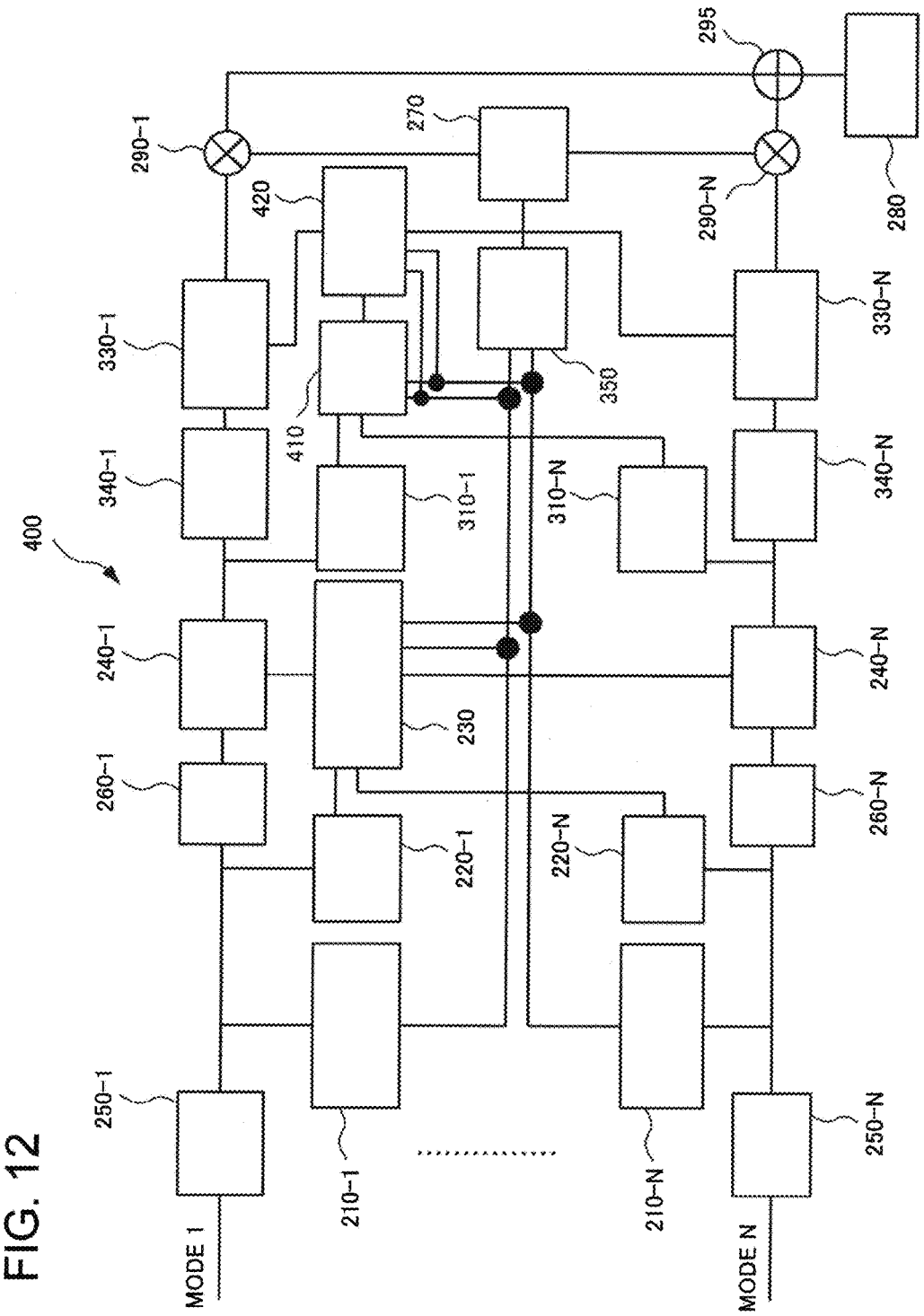
FIG. 12 is a block diagram illustrating the configuration of a received signal processor according to a fourth example embodiment of the present invention.
Figure 13:
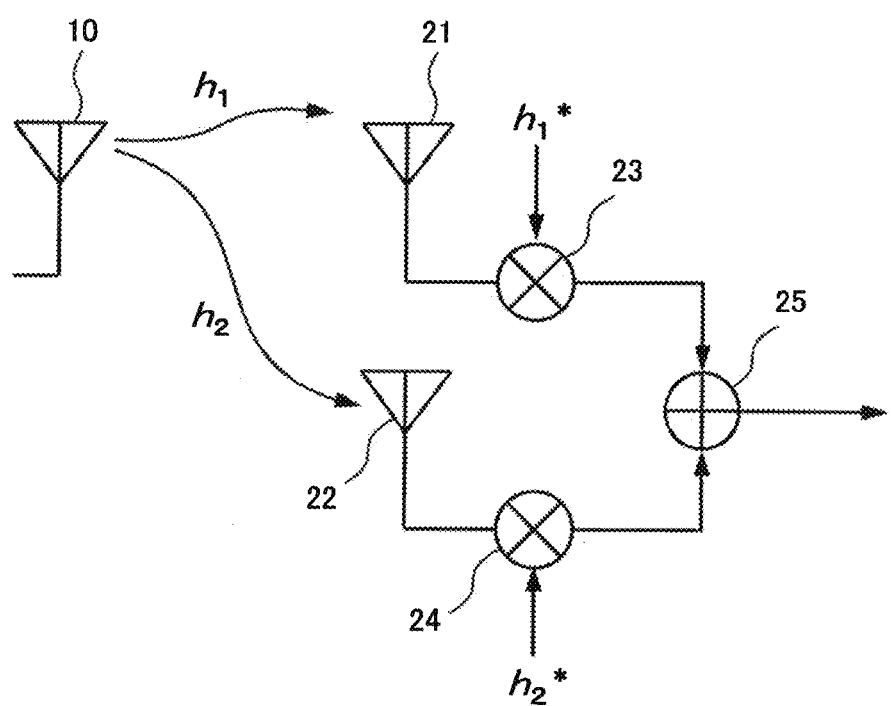
FIG. 13 is a block diagram illustrating the configuration of a related transmission system to explain the maximal ratio combining method.
Figure 14:
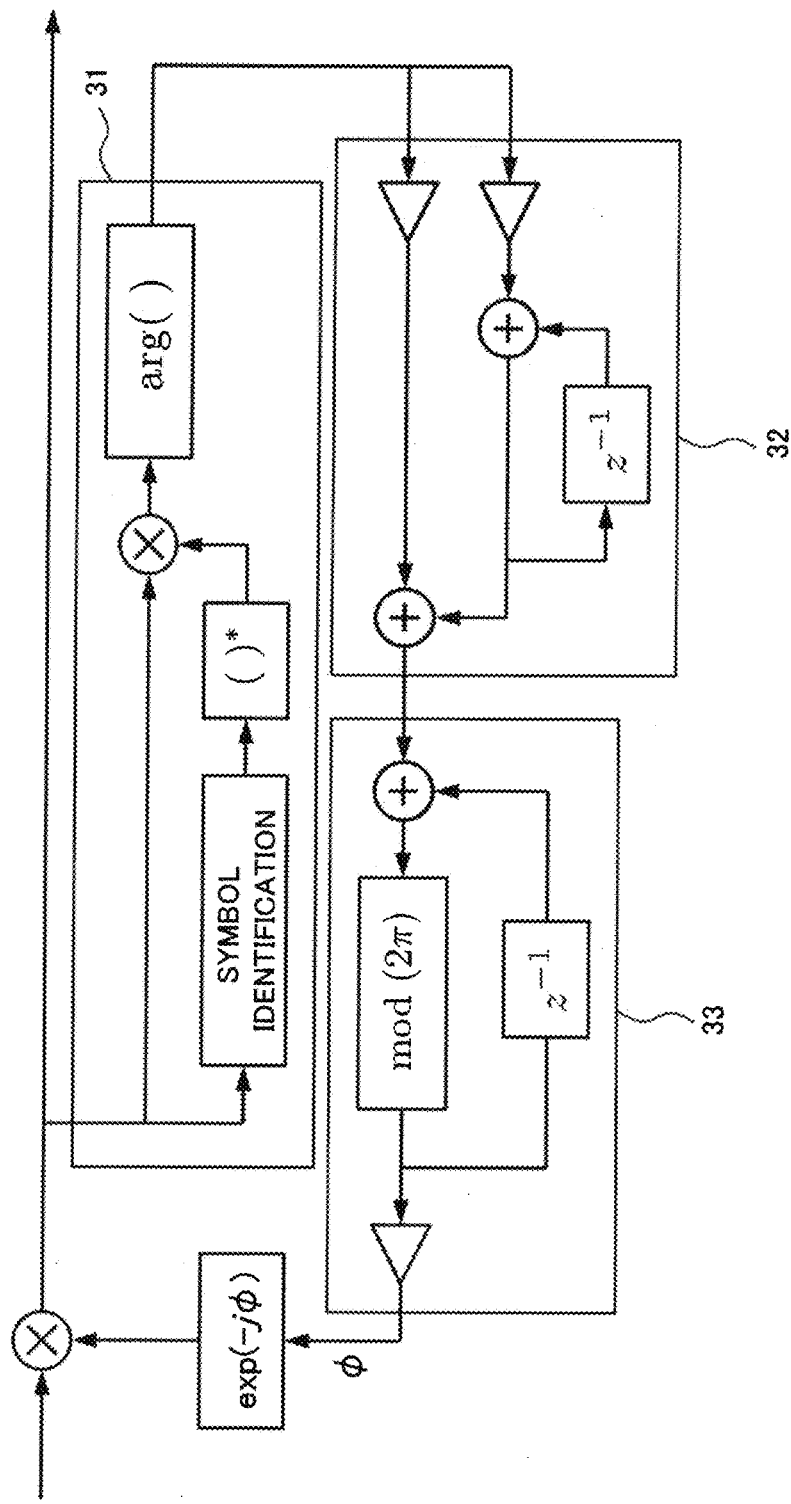
FIG. 14 is a block diagram illustrating the configuration of a related DD-PLL processing unit.

Next, a fourth example embodiment of the present invention will be described. FIG. 12 is a block diagram illustrating the configuration of a received signal processor 400 according to the fourth example embodiment of the present invention.

The received signal processor 400 according to the present example embodiment has a configuration in which a selection means 410 is added to the received signal processor 300 according to the third example embodiment; consequently, the operation of a cycle-slip detection means 420 is changed. The other configurations and operations are similar to those of the received signal processor 300 according to the third example embodiment, so their descriptions will not be repeated.

The selection means 410 selects second symbol signal sequences corresponding to digital signal sequences with lower signal-to-noise ratios from among a plurality of (N) second symbol signal sequences output from the second temporary decision means 310-1 to 310-N, respectively. That is to say, the selection means 410 selects only second symbol signals in K modes with lower signal-to-noise ratio from among the second symbol signals in the N modes, and the second symbol signals in the N modes have been output from the second temporary decision means 310-1 to 310-N.

The cycle-slip detection means 420 detects cycle slips in the second digital signal sequences, based on the second symbol signal sequences selected by the selection means 410 and the second symbol signal sequence corresponding to the digital signal sequence with the highest signal-to-noise ratio. In the received signal processor 300 of the second example embodiment, the cycle-slip detection means 420 is configured to detect a cycle slip in the second symbol signal sequences in all the N modes. In contrast, in the present example embodiment, the cycle-slip detection means 420 is configured to detect a cycle slip from the second symbol signal sequences in K modes. In this case, no cycle slip is detected for the (N−K) remaining unselected modes.

The above-described configuration makes it possible to decrease the circuit size constituting the cycle-slip detection means 420 by K/N times. Even in this case, it is possible to keep the performance degradation due to large reductions in the circuit size within an acceptable range because the cycle slip has a great chance of occurring in a digital signal sequence whose signal-to-noise ratio has deteriorated.

The whole or part of the example embodiments disclosed above can be described as, but not limited to, the following supplementary notes.

(Supplementary note 1) A received signal processor, comprising: a plurality of signal-to-noise ratio estimation means for estimating respective signal-to-noise ratios of a plurality of digital signal sequences in which relative phase errors of a plurality of received signal sequences having been corrected; a plurality of temporary decision means for performing symbol decisions of the plurality of digital signal sequences and outputting symbol signal sequences; symbol-map-rotation determination means for determining respective phase rotation amounts of the plurality of digital signal sequences from the plurality of symbol signal sequences and the respective signal-to-noise ratios of the plurality of digital signal sequences; and a plurality of phase rotation means for rotating phases of the plurality of digital signal sequences respectively based on the phase rotation amounts.

(Supplementary note 2) The received signal processor according to Supplementary note 1, wherein the symbol-map-rotation determination means determines the respective phase rotation amounts in order to match, to a phase of a digital signal sequence with the highest signal-to-noise ratio among the plurality of digital signal sequences, phases of the other digital signal sequences.

(Supplementary note 3) The received signal processor according to Supplementary note 1 or 2, wherein the symbol-map-rotation determination means determines the phase rotation amount from the plurality of symbol signal sequences and the respective signal-to-noise ratios of the plurality of digital signal sequences, for the symbol signal sequence corresponding to the digital signal sequence with the signal-to-noise ratio not larger than a predetermined threshold, and determines to set the phase rotation amount at a value already calculated, for a symbol signal sequence corresponding to the digital signal sequence with the signal-to-noise ratio higher than the predetermined threshold.

(Supplementary note 4) The received signal processor according to any one of Supplementary notes 1, 2, and 3, further comprising: weight calculation means for calculating weights each of which being a ratio of the respective signal-to-noise ratio to a maximum value of the signal-to-noise ratio; a plurality of multiplication means for multiplying the weights by second digital signal sequences output from the phase rotation means, respectively; an addition means for calculating a sum of a plurality of weighted digital signals output from the plurality of multiplication means; and decision means for performing symbol decision from a signal output from the addition means.

(Supplementary note 5) The received signal processor according to any one of Supplementary notes 1, 2, and 3, further comprising: a plurality of second temporary decision means for performing symbol decisions of the second digital signal sequences output from the phase rotation means and outputting second symbol signal sequences; cycle-slip detection means for detecting cycle slips in the second digital signal sequences based on a second symbol signal sequence corresponding to the second symbol signal sequence with the highest signal-to-noise ratio, of the plurality of second symbol signal sequences; and a plurality of cycle-slip compensation means for performing processing for compensating for phase rotation due to the cycle slips, on the plurality of second digital signal sequences, respectively.

(Supplementary note 6) The received signal processor according to Supplementary note 5, further comprising: weight calculation means for calculating weights each of which being a ratio of the respective signal-to-noise ratio to a maximum value of the signal-to-noise ratio; a plurality of multiplication means for multiplying the weights by third digital signal sequences output from the cycle-slip compensation means, respectively; an addition means for calculating a sum of a plurality of weighted digital signals output from the plurality of multiplication means; and decision means for performing symbol decision from a signal output from the addition means.

(Supplementary note 7) The received signal processor according to Supplementary note 5 or 6, further comprising selection means for selecting a second symbol signal sequence corresponding to the digital signal sequence with lower signal-to-noise ratio from among the plurality of second symbol signal sequences, wherein the cycle-slip detection means detects a cycle slip in the second digital signal sequence, based on the second symbol signal sequence selected by the selection means and the second symbol signal sequence corresponding to the digital signal sequence with the highest signal-to-noise ratio.

(Supplementary note 8) A method for processing a received signal, comprising: estimating respective signal-to-noise ratios of a plurality of digital signal sequences in which relative phase errors of a plurality of received signal sequences having been corrected; generating a plurality of symbol signal sequences by performing symbol decisions of the plurality of digital signal sequences; determining respective phase rotation amounts of the plurality of digital signal sequences from the plurality of symbol signal sequences and the respective signal-to-noise ratios of the plurality of digital signal sequences; and rotating phases of the plurality of digital signal sequences respectively based on the phase rotation amounts.

(Supplementary note 9) The method for processing a received signal according to Supplementary note 8, wherein the determining of the phase rotation amounts includes determining the respective phase rotation amounts in order to match, to a phase of a digital signal sequence with the highest signal-to-noise ratio among the plurality of digital signal sequences, phases of the other digital signal sequences.

(Supplementary note 10) The method for processing a received signal according to Supplementary note 8 or 9, further comprising: generating a plurality of second symbol signal sequences by performing symbol decisions of second digital signal sequences obtained by rotating phases of the plurality of digital signal sequences based on the phase rotation amounts, respectively; detecting cycle slips in the second digital signal sequences based on a second symbol signal sequence corresponding to the second symbol signal sequence with the highest signal-to-noise ratio, of the plurality of second symbol signal sequences; and performing processing for compensating for phase rotation due to the cycle slips, on the plurality of second digital signal sequences, respectively.

(Supplementary note 11) The received signal processor according to any one of Supplementary notes 1, 2, 3, 4, 5, 6, and 7, further comprising phase correction means for receiving the plurality of received signal sequences and outputting the plurality of digital signal sequences.

(Supplementary note 12) The received signal processor according to any one of Supplementary notes 1, 2, 3, 4, 5, 6, 7, and 11, further comprising delay means for delaying the digital signal sequences in accordance with processing times of the signal-to-noise ratio estimation means and the symbol-map-rotation determination means.

(Supplementary note 13) The received signal processor according to any one of Supplementary notes 1, 2, 3, 4, 5, 6, 7, 11, and 12, wherein the signal-to-noise ratio estimation means estimate the signal-to-noise ratios from some of the plurality of digital signal sequences.

(Supplementary note 14) The received signal processor according to any one of Supplementary notes 1, 2, 3, 4, 5, 6, 7, 11, 12, and 13, wherein the symbol-map-rotation determination means determines the phase rotation amounts from some of the plurality of symbol signal sequences.

(Supplementary note 15) The received signal processor according to any one of Supplementary notes 5, 6, and 7, further comprising second delay means for delaying the second digital signal sequences in accordance with a processing time of the cycle-slip detection means.

(Supplementary note 16) The received signal processor according to any one of Supplementary notes 5, 6, 7, and 15, further comprising third delay means for delaying signals output from the signal-to-noise ratio estimation means, in accordance with a processing time of the cycle-slip detection means.

(Supplementary note 17) The received signal processor according to any one of Supplementary notes 5, 6, 7, 15, and 16, wherein the cycle-slip detection means detects the cycle slips using some of the plurality of second symbol signal sequences.

(Supplementary note 18) The method for processing a received signal according to any one of Supplementary notes 8, 9, and 10, wherein the determining of the respective phase rotation amounts includes determining the phase rotation amount from the plurality of symbol signal sequences and the respective signal-to-noise ratios of the plurality of digital signal sequences, for the symbol signal sequence corresponding to the digital signal sequence, the signal-to-noise ratio of which is not more than a predetermined threshold, and determining an already calculated value as the phase rotation amount for the symbol signal sequence corresponding to the digital signal sequence, the signal-to-noise ratio of which is higher than the predetermined threshold.

(Supplementary note 19) The method for processing a received signal according to any one of Supplementary notes 8, 9, 10, and 18, further comprising: calculating respective weights as ratios of the respective signal-to-noise ratios to a maximum value of the signal-to-noise ratio; multiplying the weights and second digital signal sequences obtained by rotating the phases of the plurality of digital signal sequences, respectively, based on the phase rotation amounts, respectively; calculating a sum of a plurality of weighted digital signals obtained by multiplying the respective weights; and performing symbol decision from the sum of the plurality of weighted digital signals.

(Supplementary note 20) The method for processing a received signal according to Supplementary note 10, further comprising: calculating respective weights as ratios of the respective signal-to-noise ratios to a maximum value of the signal-to-noise ratio; multiplying the weights and third digital signal sequences obtained by compensating for phase rotation due to the cycle slips, respectively; calculating a sum of a plurality of weighted digital signals obtained by multiplying the respective weights; and performing symbol decision from the sum of the plurality of weighted digital signals.

(Supplementary note 21) The method for processing a received signal according to Supplementary note 10 or 20, further comprising: selecting a second symbol signal sequence corresponding to the digital signal sequence, the signal-to-noise ratio of which is low, from the plurality of second symbol signal sequences; and detecting cycle slips in the second digital signal sequences, based on the selected second symbol signal sequence and the second symbol signal sequence corresponding to the digital signal sequence with the highest signal-to-noise ratio.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-216736, filed on Nov. 4, 2015, the disclosure of which is incorporated herein in its entirety by reference.

REFERENCE SIGNS LIST

100, 200, 300, 400 received signal processor
110-1-110-N, 210-1-210-N signal-to-noise ratio estimation means
120-1-120-N, 220-1-220-N temporary decision means
130, 230 symbol-map-rotation determination means
140-1-140-N, 240-1-240-N phase rotation means
250-1-250-N phase correction means
260-1-260-N delay means
270 weight calculation means
280 decision means
290-1-290-N multiplier
295 adder
310-1-310-N second temporary decision means
320, 420 cycle-slip detection means
330-1-330-N cycle-slip compensation means
340-1-340-N second delay means
350 third delay means
410 selection means
10 sending antenna
21 first receiving antenna
22 second receiving antenna
23 first multiplier
24 second multiplier
25 adder
31 error detection unit
32 loop filter unit
33 DCO unit
40 ideal symbol point
41, 42, 43 received symbol point

The invention claimed is:
1. A received signal processor, comprising:
at least one processor configured to implement:
a plurality of signal-to-noise ratio estimation sections configured to estimate respective signal-to-noise ratios of a plurality of digital signal sequences in which relative phase errors of a plurality of received signal sequences have been corrected;
a plurality of temporary decision sections configured to perform symbol decisions of the plurality of digital signal sequences and output symbol signal sequences;
a symbol-map-rotation determination section configured to determine respective phase rotation amounts of the plurality of digital signal sequences from the plurality of symbol signal sequences and the respective signal-to-noise ratios of the plurality of digital signal sequences; and
a plurality of phase rotation sections configured to rotate phases of the plurality of digital signal sequences respectively based on the phase rotation amounts.

2. The received signal processor according to claim 1, wherein
the symbol-map-rotation determination section is further configured to determine the respective phase rotation amounts in order to match, to a phase of a digital signal sequence with the highest signal-to-noise ratio among the plurality of digital signal sequences, phases of the other digital signal sequences.

3. The received signal processor according to claim 2, wherein
the symbol-map-rotation determination section is further configured to:
determine the phase rotation amount from the plurality of symbol signal sequences and the respective signal-to-noise ratios of the plurality of digital signal sequences, for the symbol signal sequence corresponding to the digital signal sequence with the signal-to-noise ratio not larger than a predetermined threshold, and
determine to set the phase rotation amount at a value already calculated, for a symbol signal sequence corresponding to the digital signal sequence with the signal-to-noise ratio higher than the predetermined threshold.

4. The received signal processor according to claim 2, wherein the at least one processor is further configured to implement:
a weight calculation section configured to calculate weights each of which is a ratio of the respective signal-to-noise ratio to a maximum value of the signal-to-noise ratio;
a plurality of multiplication sections configured to multiply the weights by second digital signal sequences output from the phase rotation section, respectively;
an addition section configured to calculate a sum of a plurality of weighted digital signals output from the plurality of multiplication sections; and
a decision section configured to perform symbol decision from a signal output from the addition section.

5. The received signal processor according to claim 2, wherein the at least one processor is further configured to implement:
a plurality of second temporary decision sections configured to perform symbol decisions of the second digital signal sequences output from the phase rotation section and output second symbol signal sequences;
a cycle-slip detection section configured to detect cycle slips in the second digital signal sequences based on a second symbol signal sequence corresponding to the second symbol signal sequence with the highest signal-to-noise ratio, of the plurality of second symbol signal sequences; and
a plurality of cycle-slip compensation sections configured to perform processing for compensating for phase rotation due to the cycle slips, on the plurality of second digital signal sequences, respectively.

6. The received signal processor according to claim 5, wherein the at least one processor is further configured to implement:
a weight calculation section configured to calculate weights each of which is a ratio of the respective signal-to-noise ratio to a maximum value of the signal-to-noise ratio;
a plurality of multiplication sections configured to multiply the weights by third digital signal sequences output from the cycle-slip compensation section, respectively;
an addition section configured to calculate a sum of a plurality of weighted digital signals output from the plurality of multiplication sections; and
a decision section configured to perform symbol decision from a signal output from the addition section.

7. The received signal processor according to claim 1, wherein
the symbol-map-rotation determination section is further configured to:
determine the phase rotation amount from the plurality of symbol signal sequences and the respective signal-to-noise ratios of the plurality of digital signal sequences, for the symbol signal sequence corresponding to the digital signal sequence with the signal-to-noise ratio not larger than a predetermined threshold, and
determine to set the phase rotation amount at a value already calculated, for a symbol signal sequence corresponding to the digital signal sequence with the signal-to-noise ratio higher than the predetermined threshold.

8. The received signal processor according to claim 7, wherein the at least one processor is further configured to implement:
a weight calculation section configured to calculate weights each of which is a ratio of the respective signal-to-noise ratio to a maximum value of the signal-to-noise ratio;
a plurality of multiplication sections configured to multiply the weights by second digital signal sequences output from the phase rotation section, respectively;
an addition section configured to calculate a sum of a plurality of weighted digital signals output from the plurality of multiplication sections; and
a decision section configured to perform symbol decision from a signal output from the addition section.

9. The received signal processor according to claim 7, wherein the at least one processor is further configured to implement:
a plurality of second temporary decision sections configured to perform symbol decisions of the second digital signal sequences output from the phase rotation section and output second symbol signal sequences;
a cycle-slip detection section configured to detect cycle slips in the second digital signal sequences based on a second symbol signal sequence corresponding to the second symbol signal sequence with the highest signal-to-noise ratio, of the plurality of second symbol signal sequences; and
a plurality of cycle-slip compensation sections configured to perform processing for compensating for phase rotation due to the cycle slips, on the plurality of second digital signal sequences, respectively.

10. The received signal processor according to claim 9, wherein the at least one processor is further configured to implement:
a weight calculation section configured to calculate weights each of which is a ratio of the respective signal-to-noise ratio to a maximum value of the signal-to-noise ratio;
a plurality of multiplication sections configured to multiply the weights by third digital signal sequences output from the cycle-slip compensation section, respectively;
an addition section configured to calculate a sum of a plurality of weighted digital signals output from the plurality of multiplication sections; and a decision section configured to perform symbol decision from a signal output from the addition section.

11. The received signal processor according to claim 1, wherein the at least one processor is further configured to implement:
  a weight calculation section configured to calculate weights each of which is a ratio of the respective signal-to-noise ratio to a maximum value of the signal-to-noise ratio;
  a plurality of multiplication sections configured to multiply the weights by second digital signal sequences output from the phase rotation section, respectively;
  an addition section configured to calculate a sum of a plurality of weighted digital signals output from the plurality of multiplication sections; and
  a decision section configured to perform symbol decision from a signal output from the addition section.

12. The received signal processor according to claim 1, wherein the at least one processor is further configured to implement:
  a plurality of second temporary decision sections configured to perform symbol decisions of the second digital signal sequences output from the phase rotation section and output second symbol signal sequences;
  a cycle-slip detection section configured to detect cycle slips in the second digital signal sequences based on a second symbol signal sequence corresponding to the second symbol signal sequence with the highest signal-to-noise ratio, of the plurality of second symbol signal sequences; and
  a plurality of cycle-slip compensation sections configured to perform processing for compensating for phase rotation due to the cycle slips, on the plurality of second digital signal sequences, respectively.

13. The received signal processor according to claim 12, wherein the at least one processor is further configured to implement:
  a weight calculation section configured to calculate weights each of which being a ratio of the respective signal-to-noise ratio to a maximum value of the signal-to-noise ratio;
  a plurality of multiplication sections configured to multiply the weights by third digital signal sequences output from the cycle-slip compensation sections, respectively;
  an addition section configured to calculate a sum of a plurality of weighted digital signals output from the plurality of multiplication sections; and
  a decision section configured to perform symbol decision from a signal output from the addition section.

14. The received signal processor according to claim 13, wherein the at least one processor is further configured to implement
  a selection section configured to select a second symbol signal sequence corresponding to the digital signal sequence with lower signal-to-noise ratio from among the plurality of second symbol signal sequences,
  wherein the cycle-slip detection section is further configured to detect a cycle slip in the second digital signal sequence, based on the second symbol signal sequence selected by the selection section and the second symbol signal sequence corresponding to the digital signal sequence with the highest signal-to-noise ratio.

15. The received signal processor according to claim 12, wherein the at least one processor is further configured to implement
  a selection section configured to select a second symbol signal sequence corresponding to the digital signal sequence with lower signal-to-noise ratio from among the plurality of second symbol signal sequences,
  wherein the cycle-slip detection section is configured to detect a cycle slip in the second digital signal sequence, based on the second symbol signal sequence selected by the selection section and the second symbol signal sequence corresponding to the digital signal sequence with the highest signal-to-noise ratio.

16. A method for processing a received signal, comprising:
  estimating respective signal-to-noise ratios of a plurality of digital signal sequences in which relative phase errors of a plurality of received signal sequences have been corrected;
  generating a plurality of symbol signal sequences by performing symbol decisions of the plurality of digital signal sequences;
  determining respective phase rotation amounts of the plurality of digital signal sequences from the plurality of symbol signal sequences and the respective signal-to-noise ratios of the plurality of digital signal sequences; and
  rotating phases of the plurality of digital signal sequences respectively based on the phase rotation amounts.

17. The method for processing a received signal according to claim 16,
  wherein the determining of the phase rotation amounts includes determining the respective phase rotation amounts in order to match, to a phase of a digital signal sequence with the highest signal-to-noise ratio among the plurality of digital signal sequences, phases of the other digital signal sequences.

18. The method for processing a received signal according to claim 17, further comprising:
  generating a plurality of second symbol signal sequences by performing symbol decisions of second digital signal sequences obtained by rotating phases of the plurality of digital signal sequences based on the phase rotation amounts, respectively;
  detecting cycle slips in the second digital signal sequences based on a second symbol signal sequence corresponding to the second symbol signal sequence with the highest signal-to-noise ratio, of the plurality of second symbol signal sequences; and
  performing processing for compensating for phase rotation due to the cycle slips, on the plurality of second digital signal sequences, respectively.

19. The method for processing a received signal according to claim 16, further comprising:
  generating a plurality of second symbol signal sequences by performing symbol decisions of second digital signal sequences obtained by rotating phases of the plurality of digital signal sequences based on the phase rotation amounts, respectively;
  detecting cycle slips in the second digital signal sequences based on a second symbol signal sequence corresponding to the second symbol signal sequence with the highest signal-to-noise ratio, of the plurality of second symbol signal sequences; and
  performing processing for compensating for phase rotation due to the cycle slips, on the plurality of second digital signal sequences, respectively.

* * * * *

UNITED STATES PATENT AND TRADEMARK OFFICE
CERTIFICATE OF CORRECTION

PATENT NO. : 10,511,409 B2
APPLICATION NO. : 15/773035
DATED : December 17, 2019
INVENTOR(S) : Kohei Hosokawa et al.

Page 1 of 1

It is certified that error appears in the above-identified patent and that said Letters Patent is hereby corrected as shown below:

In the Specification

Column 9, Line 20; Delete ""0","  and insert --"θ",-- therefor

Column 9, Line 64; Delete "(i=P)" and insert --(i=1, . . . , P)-- therefor

Column 9, Line 66; Delete "(i=P;" and insert --(i=1, . . . , P;-- therefor

Column 10, Line 10; Delete "2n." and insert --2π.-- therefor

Column 10, Line 13; Delete "2n." and insert --2π.-- therefor

Column 20, Lines 8-11; Delete "This application is based upon and claims the benefit of priority from Japanese patent application No. 2015-216736, filed on Nov. 4, 2015, the disclosure of which is incorporated herein in its entirety by reference." therefor Signed and Sealed this
Twenty-fourth Day of November, 2020

Andrei Iancu
*Director of the United States Patent and Trademark Office*